(12) United States Patent
Mori et al.

(10) Patent No.: US 8,740,476 B2
(45) Date of Patent: Jun. 3, 2014

(54) CONNECTORED CABLE AND METHOD FOR MANUFACTURING CONNECTORED CABLE

(71) Applicant: Fujikura LTD., Tokyo (JP)

(72) Inventors: Masao Mori, Sakura (JP); Koji Azegami, Sakura (JP); Shinya Abe, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/889,792

(22) Filed: May 8, 2013

(65) Prior Publication Data

US 2013/0272662 A1    Oct. 17, 2013

(30) Foreign Application Priority Data

Sep. 28, 2011 (JP) ................................. 2011-213144
Oct. 3, 2011 (JP) ................................. 2011-219450
Oct. 3, 2011 (JP) ................................. 2011-219451

(51) Int. Cl.
G02B 6/36 (2006.01)
(52) U.S. Cl.
USPC .......................................................... 385/88
(58) Field of Classification Search
None
See application file for complete search history.

(56) References Cited

U.S. PATENT DOCUMENTS

| 5,708,745 | A * | 1/1998 | Yamaji et al. ................... 385/92 |
| 6,709,168 | B2 * | 3/2004 | Imabayashi et al. ............ 385/88 |
| 2007/0086723 | A1 * | 4/2007 | Sasaki et al. ................... 385/137 |
| 2010/0098382 | A1 | 4/2010 | Tamura et al. |

FOREIGN PATENT DOCUMENTS

| CN | 1981226 A | 6/2007 |
| CN | 101652690 A | 2/2010 |
| EP | 2 120 075 A1 | 11/2009 |
| EP | 2267503 A1 | 12/2010 |
| JP | 62-128462 A | 6/1987 |
| JP | 05-226027 A | 9/1993 |
| JP | 05-315767 A | 11/1993 |
| JP | 2003-139964 A | 5/2003 |
| JP | 2004-287184 A | 10/2004 |
| JP | 2007-114369 A | 5/2007 |
| JP | 2010-066474 A | 3/2010 |
| JP | 2010-135109 A | 6/2010 |
| JP | 2010-244800 A | 10/2010 |
| JP | 2011-090898 A | 5/2011 |
| JP | 2011-146259 A | 7/2011 |
| WO | 2009/069571 A1 | 6/2009 |

OTHER PUBLICATIONS

Office Action for JP 2011-213144 dated Oct. 15, 2012.
Office Action for JP 2011-219450 dated Oct. 15, 2012.

(Continued)

*Primary Examiner* — Tina Wong
(74) *Attorney, Agent, or Firm* — Sughrue Mion, PLLC

(57) ABSTRACT

A connectored cable including a cable having an optical fiber for transmitting an optical signal; and a connector that accommodates a substrate on which a photoelectric conversion portion that is optically coupled to an end face of the optical fiber is installed, and in which the optical fiber is wired so that at least three bent portions are formed, the orientation of the optical fiber in a front-rear direction being changed, the optical fiber being bent into a U shape at each of the bent portions, and so that one of two bent portions on a front side is located on a down side of the substrate and the other bent portion on the front side is located on an up side of the substrate.

14 Claims, 24 Drawing Sheets

(56) References Cited

OTHER PUBLICATIONS

Office Action for JP 2011-219451 dated Oct. 15, 2012.
Office Action for JP 2011-213144 dated Jan. 23, 2013.
Office Action for JP 2011-219450 dated Jan. 23, 2013.
Office Action for JP 2011-219451 dated Jan. 23, 2013.
International Search Report for PCT/JP2012/063202 dated Aug. 14, 2012.
International Search Opinion for PCT/JP2012/063202.
Office Action issued by Chinese Patent Office in Chinese Application No. 201280006915.2 mailed Jan. 20, 2014.

* cited by examiner

CONNECTORED CABLE AND METHOD FOR MANUFACTURING CONNECTORED CABLE

CROSS REFERENCE TO RELATED APPLICATIONS

This application is a Bypass Continuation of International Application No. PCT/JP2012/063202 filed May 23, 2012, claiming priority based on Japanese Patent Application No. 2011-213144 filed Sep. 28, 2011 and 2011-219450 and 2011-240451 filed Oct. 3, 2011, the contents of all of which are incorporated herein by reference in their entirety.

TECHNICAL FIELD

The present invention relates to a connectored cable and a method for manufacturing the connectored cable.

BACKGROUND ART

To perform optical transmission between devices, for example, it is possible to use a scheme as follows: a photoelectric conversion portion that performs conversion between electrical and optical signals is provided in each device, an optical cable is connected to the photoelectric conversion portions with optical connectors, and optical signals is sent and received through this optical fiber cable.

This scheme has a problem that any dirt or foreign matter deposited on the optical connectors may degrade signals. Moreover, in this scheme, an optical fiber processing portion and a photoelectric conversion portion need to be provided in a device. Thus, a connectored cable has been proposed in which photoelectric conversion portions are provided on the connector side (PTL 1).

CITATION LIST

Patent Literature

[PTL 1] JP H5-226027A

SUMMARY OF THE INVENTION

Problem to be Solved by the Invention

In recent years, with the reduction in device sizes and the increase in the amount of information transmission, a need to accommodate an optical fiber within a small connector has been arising. On the other hand, in order to suppress damage to the optical fiber and the optical coupling portion when a tension is applied to the cable, it is necessary to secure a sufficient extra length of the optical fiber within the connector.

However, even when a sufficient extra length of the optical fiber is secured within the connector, if the optical fiber is in a state in which it is likely to move inside the connector, damage to the optical coupling portion cannot be suppressed.

It is an object of the present invention to suppress damage to the optical coupling portion while managing the extra length so that the optical fiber is unlikely to move inside the connector.

Means for Solving the Problem

In order to achieve the object, a first primary aspect of the invention is a connectored cable including: a cable having an optical fiber for transmitting an optical signal; and a connector that accommodates a substrate on which a photoelectric conversion portion that is optically coupled to an end face of the optical fiber is installed, and in which the optical fiber is wired so that at least three bent portions are formed, the orientation of the optical fiber in a front-rear direction being changed, the optical fiber being bent into a U shape at each of the bent portions, and so that one of two bent portions on a front side is located on a down side of the substrate and the other bent portion on the front side is located on an up side of the substrate, the front-rear direction referring to a direction in which the cable extends from the connector, a rear side referring to a side in which the cable extends as seen from the connector, the front side referring to an opposite side of the side in which the cable extends, the up side referring to a side of the photoelectric conversion portion as seen from the substrate, the down side referring to an opposite side of the side of the photoelectric conversion portion.

Other features of the invention will become clear through the following description and the accompanying drawings.

Effects of the Invention

According to the invention, it is possible to suppress damage to the optical coupling portion while managing the extra length of the optical fiber so that the optical fiber is less likely to move within the connector.

BEST MODE FOR CARRYING OUT THE INVENTION

Figure 1:
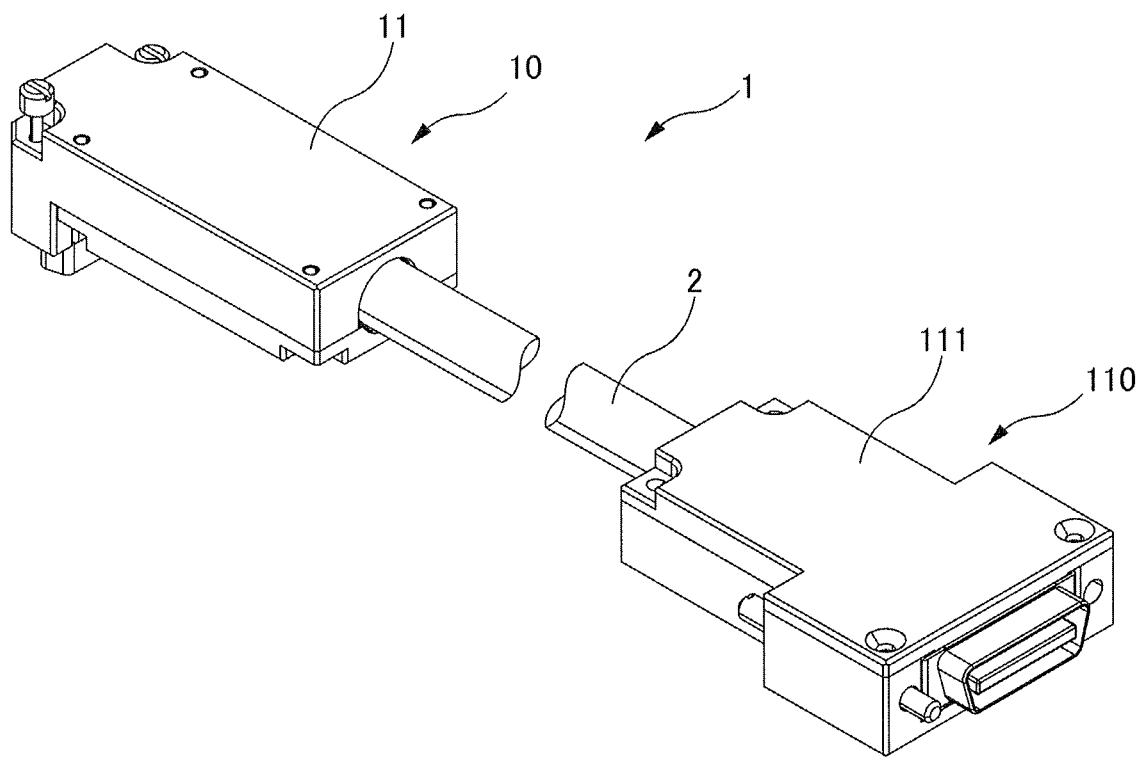
FIG. 1 is an overall perspective view of a connectored cable 1 of an embodiment.

At least the following matters will be made clear by the description of the present specification and the accompanying drawings.

(1)

A connectored cable will now be described. A connectored cable including: a cable having an optical fiber for transmitting an optical signal; and a connector that accommodates a substrate on which a photoelectric conversion portion that is optically coupled to an end face of the optical fiber is installed, and in which the optical fiber is wired so that at least three bent portions are formed, the orientation of the optical fiber in a front-rear direction being changed, the optical fiber being bent into a U shape at each of the bent portions, and so that one of two bent portions on a front side is located on a down side of the substrate and the other bent portion on the front side is located on an up side of the substrate, the front-rear direction referring to a direction in which the cable extends from the connector, a rear side referring to a side in which the cable extends as seen from the connector, the front side referring to an opposite side of the side in which the cable extends, the up side referring to a side of the photoelectric conversion portion as seen from the substrate, the down side referring to an opposite side of the side of the photoelectric conversion portion.

With this connectored cable, it is possible to suppress damage to the optical coupling portion while managing the extra length so that the optical fiber is less likely to move within the connector.

It is desirable that a recess is formed on an edge of the substrate, and that the optical fiber is wired between the lower side and the upper side of the substrate bypassing through a space between an inner surface of the connector and the recess. With this configuration, the connector size can be reduced.

It is desirable that the photoelectric conversion portion is mounted on a child substrate that is different from the substrate, and that the photoelectric conversion portion is installed on the substrate by electrically connecting the substrate and the child substrate. This configuration facilitates wiring of the optical fiber.

It is desirable that the optical fiber is wired with being sandwiched between the substrate and the child substrate. With this configuration, it is possible to restrain movement of the optical fiber within the connector.

It is desirable that the bent portion that is formed on the rear side is located on the up side of the substrate with respect to the two bent portions on the front side, and that a portion between the two bent portions that are located on the up side of the substrate is sandwiched between the substrate and the child substrate. With this configuration, an end of the optical fiber is less likely to move, and damage to the optical coupling portion can be suppressed.

It is desirable that the optical fiber is bent between the bent portion that is located on the upper side of the substrate and the end face of the optical fiber, and that the end face of the optical fiber and the photoelectric conversion portion are coupled to each other in such a manner that the optical fiber is slanted at an acute angle with respect to the front-rear direction. With this configuration, the connector size can be reduced.

It is desirable that the substrate has a recessed portion that is obliquely formed with respect to the front-rear direction, that the optical fiber is arranged along the recessed portion, and that the end face of the optical fiber and the photoelectric conversion portion are coupled in such a manner that the optical fiber is slanted at an acute angle with respect to the front-rear direction. With this configuration, it is possible to avoid interference between the optical fiber and the substrate.

It is desirable that a portion of a coating of the optical fiber is located in the recessed portion, and the coating of the optical fiber and the substrate are bonded in the recessed portion. This configuration makes it easier to bond the optical fiber.

It is desirable that the photoelectric conversion portion is mounted on a child substrate that is different from the substrate, that the photoelectric conversion portion is installed on the substrate by electrically connecting the substrate and the child substrate, that the optical fiber is wired with a portion of the optical fiber being sandwiched between the substrate and the child substrate, and that a bending direction of the optical fiber in the bent portion that is located closer to the end face of the optical fiber than the sandwiched portion is the same as a bending direction of the optical fiber between that bent portion and the end face of the optical fiber. With this configuration, the end of the optical fiber is extremely unlikely to move.

It is desirable that the cable further includes a signal line, that the substrate includes a through hole for connecting an end portion of the signal line by through-hole connection, and that inside the connector, any of the bent portions is located above a coating of the signal line that is connected to the substrate by through-hole connection. With this configuration, damage to the optical fiber can be suppressed.

It is desirable that the substrate includes a rear-side through hole that is located on the side in which the cable extends and a front-side through hole that is formed on the front side with respect to the rear-side through hole, and that a direction in which the end portion of the signal line is inserted into the rear-side through hole is opposite to a direction in which the end portion of the signal line is inserted into the front-side through hole. With this configuration, signal lines can be distributed to both sides of the substrate.

It is desirable that any of the bent portions is located above the coating of the signal line that is connected to the rear-side through hole by through-hole connection. Although it is necessary to connect the signal line to the front-side through hole by through-hole connection while being curved, it is not necessary to connect the signal line to the rear-side through hole by through-hole connection while being curved. Therefore, the signal line and the bent portion can be wired in such a manner that they do not become bulky.

It is desirable that the photoelectric conversion portion is mounted on a child substrate that is different from the substrate, that the photoelectric conversion portion is installed on the substrate by electrically connecting the substrate and the child substrate to each other, and that on both sides of the bent portion that is located above the coating of the signal line, the optical fiber is wired with a portion of the optical fiber being sandwiched between the substrate and the child substrate. With this configuration, it is possible to suppress damage to the optical coupling portion while managing the extra length so that the optical fiber is unlikely to move within the connector.

A method will be described which is for manufacturing a connectored cable including a cable having an optical fiber for transmitting an optical signal, and a connector that accommodates a substrate on which a photoelectric conversion portion that is optically coupled to an end face of the optical fiber is installed. The method includes: preparing the cable; optically coupling the end face of the optical fiber and the photoelectric conversion portion to each other; and wiring the optical fiber so that at least three bent portions are formed, the orientation of the optical fiber in a front-rear direction being changed, the optical fiber being bent into a U shape at each of the bent portions, so that one of two bent portions on a front side is located on a down side of the substrate and the other bent portion on the front side is located on a up side of the substrate, the front-rear direction referring to a direction in which the cable extends from the connector, a rear side referring to a side in which the cable extends as seen from the connector, the front side referring to an opposite side of the side in which the cable extends, the up side referring to a side of the photoelectric conversion portion as seen from the substrate, the down side referring to an opposite side of the side of the photoelectric conversion portion.

With this manufacturing method, it is possible to manufacture a connectored cable in which damage to the optical coupling portion is less likely to occur.

(2)

In recent years, with the reduction in device sizes and the increase in the amount of information transmission, a need to accommodate an optical fiber within a small connector has been arising. On the other hand, in order to suppress damage to the optical fiber and the optical coupling portion when a tension is applied to the cable, it is necessary to secure a sufficient extra length of the optical fiber within the connector. Thus, it is an object of a second aspect of the invention to reduce the connector size while securing a sufficient extra length of the optical fiber within the connector.

In order to achieve the object, a second primary aspect of the invention is a connectored cable including a cable having an optical fiber and a connector that accommodates a photoelectric conversion portion that is optically coupled to an end face of the optical fiber, and in which a bent portion is formed, the orientation of the optical fiber in a front-rear direction being changed, the optical fiber being bent into a U shape at the bent portion, the front-rear direction referring to a direction in which the cable extends from the connector, wherein the optical fiber is bent between the bent portion and the end face of the optical fiber, and the end face of the optical fiber and the photoelectric conversion portion are coupled to each other in such a manner that the optical fiber forms an acute angle with respect to the front-rear direction. With this connectored cable, it is possible to reduce the connector size while securing a sufficient extra length of the optical fiber within the connector.

It is desirable that a substrate on which the photoelectric conversion portion is mounted is accommodated in the connector, that the substrate has a recessed portion that is obliquely formed with respect to the front-rear direction, that the optical fiber is arranged along the recessed portion, and that the end face of the optical fiber and the photoelectric conversion portion are coupled in such a manner that the optical fiber is slanted at an acute angle with respect to the front-rear direction. With this configuration, it is possible to avoid interference between the optical fiber and the substrate.

It is desirable that a portion of a coating of the optical fiber is located in the recessed portion, and that the coating of the optical fiber and the substrate are bonded in the recessed portion. This configuration makes it easier to bond the optical fiber.

It is desirable that the connector accommodates a child substrate on which the photoelectric conversion portion is mounted and a parent substrate on which the child substrate is installed and which is electrically connected to the child substrate. With this configuration, wiring of the optical fiber is facilitated.

It is desirable that the optical fiber is wired with being sandwiched between the parent substrate and the child substrate. With this configuration, it is possible to restrain movement of the optical fiber within the connector.

It is desirable that a bending direction of the optical fiber in the bent portion that is located closer to the end face of the optical fiber than the sandwiched portion is the same as a bending direction of the optical fiber between that bent portion and the end face of the optical fiber. With this configuration, the end of the optical fiber is extremely unlikely to move.

It is desirable that the optical fiber is wired inside the connector so that at least three bent portions are formed, the orientation of the optical fiber in a front-rear direction being changed, the optical fiber being bent into a U shape at each of the bent portions, and so that one of two bent portions on a front side is located on a down side of the parent substrate and the other bent portion on the front side is located on an up side of the parent substrate, a rear side referring to a side in which the cable extends as seen from the connector, the front side referring to an opposite side of the side in which the cable extends, the up side referring to a side of the child substrate as seen from the parent substrate, the down side referring to an opposite side of the side of the child substrate. With this configuration, it is possible to suppress damage to the optical coupling portion while managing the extra length so that the optical fiber is unlikely to move within the connector.

It is desirable that the cable further includes a signal line, that the parent substrate includes a through hole for connecting an end portion of the signal line by through-hole connection, and that, when a side in which the cable extends as seen from the connector is defined as a rear side and the opposite side thereof is defined as a front side, a rear-side bent portion that is another bent portion is formed inside the connector on the rear side with respect to the bent portion, and the rear-side bent portion is located inside the connector above the coating of the signal line connected to the substrate by through-hole connection. With this configuration, damage to the optical fiber can be suppressed.

A method for manufacturing a connectored cable including a cable having an optical fiber, and a connector that accommodates a photoelectric conversion portion that is optically coupled to an end face of the optical fiber will be described. The method includes: preparing the cable; optically coupling the end face of the optical fiber and the photoelectric conversion portion to each other; and wiring the optical fiber so that a bent portion is formed, the orientation of the optical fiber in a front-rear direction being changed, the optical fiber being bent into a U shape at the bent portion, the front-rear direction referring to a direction in which the cable extends from the connector, and so that by bending the optical fiber between the bent portion and the end face of the optical fiber, the end face of the optical fiber and the photoelectric conversion portion are coupled to each other in such a manner that the optical fiber forms an acute angle with respect to the front-rear direction.

With this manufacturing method, it is possible to reduce the connector size while securing a sufficient extra length of the optical fiber within the connector.

(3)

Moreover, in recent years, with the reduction in device sizes and the increase in the amount of information transmission, a need to accommodate an optical fiber within a small connector has been arising. On the other hand, in order to suppress damage to the optical fiber and the optical coupling portion when a tension is applied to the cable, it is necessary to secure a sufficient extra length of the optical fiber within the connector. However, in the case where a signal line that transmits electrical signals is connected to a substrate within the connector by through-hole connection, there is a possibility that the optical fiber whose extra length is managed within the connector may be damaged when the optical fiber will come into contact with an edge of the solder of through-hole connection. Thus, it is an object of a third aspect of the invention to suppress damage to the optical fiber caused by an edge of the solder of through-hole connection while securing a sufficient extra length of the optical fiber within the connector.

In order to achieve the object, a third primary aspect of the invention is a connectored cable including: a cable having an optical fiber and a signal line; and a connector that accommodates a substrate including a through hole for connecting an end portion of the signal line by through-hole connection, in which a bent portion is formed, the orientation of the optical fiber in a front-rear direction being changed, the optical fiber being bent into a U shape at the bent portion, the front-rear direction referring to a direction in which the cable extends from the connector, and in which the bent portion is located above a coating of the signal line connected to the substrate by through-hole connection. With this connectored cable, it is possible to suppress damage to the optical fiber caused by an edge of the solder of through-hole connection while securing a sufficient extra length of the optical fiber within the connector.

It is desirable that, when a side in which the cable extends as seen from the connector is defined as a rear side and the opposite side thereof is defined as a front side, the substrate includes a rear-side through hole that is located on the side in which the cable extends and a front-side through hole that is formed on the front side with respect to the rear-side through hole, and a direction in which the end portion of the signal line is inserted into the rear-side through hole is opposite to a direction in which the end portion of the signal line is inserted into the front-side through hole. Thus, signal lines can be distributed to both sides of the substrate.

It is desirable that the bent portion is located above the coating of the signal line that is connected to the rear-side through hole by through-hole connection. Although it is necessary to connect the signal line to the front-side through hole by through-hole connection while being curved, it is not necessary to connect the signal line to the rear-side through hole by through-hole connection while being curved. Therefore, the signal line and the bent portion can be wired in such a manner that they do not become bulky.

It is desirable that a photoelectric conversion portion that is optically coupled to the end face of the optical fiber is mounted on a child substrate that is different from the substrate, and that the connector accommodates the substrate and the child substrate which are electrically connected. With this configuration, wiring of the optical fiber is facilitated.

It is desirable that the optical fiber is wired with being sandwiched between the substrate and the child substrate. With this configuration, it is possible to restrain movement of the optical fiber within the connector.

It is desirable that on both sides of the bent portion that is located above the coating of the signal line, the optical fiber is wired with a portion of the optical fiber being sandwiched between the substrate and the child substrate. This is particularly effective in the case of a configuration in which the bent portion is likely to be subject to a force toward the substrate.

It is desirable that the optical fiber is wired so that at least three bent portions are formed in the connector, the orientation of the optical fiber in the front-rear direction being changed, the optical fiber being bent into a U shape at each of the bent portions, and so that two bent portions on a front side are located in the connector on opposite sides of the substrate, a rear side referring to a side in which the cable extends as seen from the connector, the front side referring to an opposite side of the side in which the cable extends. With this configuration, it is possible to suppress damage to the optical coupling portion while managing the extra length so that the optical fiber is unlikely to move within the connector.

In the connector, it is desirable that a front-side bent portion that is another bent portion is formed on a side closer to the end face of the optical fiber than the bent portion, that the optical fiber is bent between the front-side bent portion and the end face of the optical fiber, and that the end face of the optical fiber is connected in such a manner that the optical fiber is slanted at an acute angle with respect to the front-rear direction. With this configuration, the connector size can be reduced.

A method for manufacturing a connectored cable including a cable having an optical fiber, and a connector that accommodates a substrate including a through hole for connecting an end portion of the signal line by through-hole connection will be described. The method includes: preparing the cable; connecting the end portion of the signal line to the through hole of the substrate by through-hole connection; and wiring the optical fiber so that a bent portion is formed, the orientation of the optical fiber in a front-rear direction being changed, the optical fiber being bent into a U shape at the bent portion, the front-rear direction referring to a direction in which the cable extends from the connector, and so that the bent portion is arranged above a coating of the signal line connected to the substrate by through-hole connection.

With this manufacturing method, it is possible to manufacture a connectored cable in which damage to an optical fiber is less likely to occur.

Overall Configuration

Figure 2:
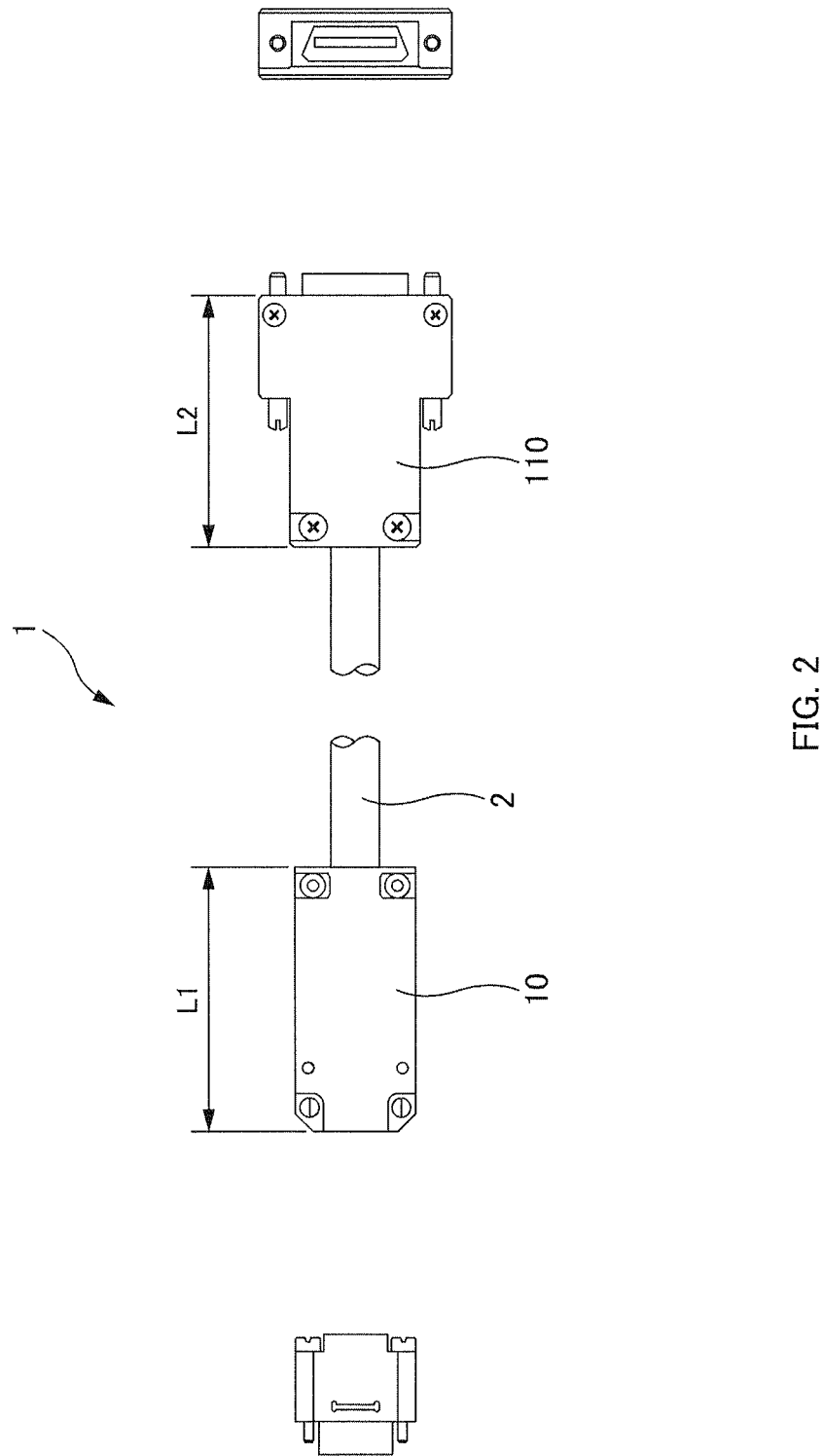
FIG. 2 shows plan views and side views of the connectored cable 1 of this embodiment.

FIG. 1 is an overall perspective view of a connectored cable 1 according to an embodiment. FIG. 2 shows a plan view and side views of the connectored cable 1 according to this embodiment.

The connectored cable 1 is composed of a composite cable 2 and two connectors provided on both ends of the composite cable 2. The connectored cable 1 of this embodiment is configured so as to comply with the Camera Link interface; one connector serves as a camera-side connector (sender-side connector) and the other connector serves as a grabber-side connector 110 (receiver-side connector). The camera-side connector 10 and the grabber-side connector 110 each have a 26-pin connector terminal.

According to the Base Configuration, which is a type of Camera Link standard, signals (video signals and control signals) are transmitted between the camera-side connector 10 and the grabber-side connector 110 through a differential signal line composed of a metal cable. However, due to restrictions during transmission of video signals through differential signal lines, the Camera Link standard specifies that the maximum transmission distance is 10 m. In contrast, in this embodiment, video signals, which should be transmitted using a plurality of differential signal lines, are transmitted through an optical fiber by time division multiplexing. Thus, the connectored cable 1 of this embodiment can achieve a transmission distance of about 30 m.

Figure 3:
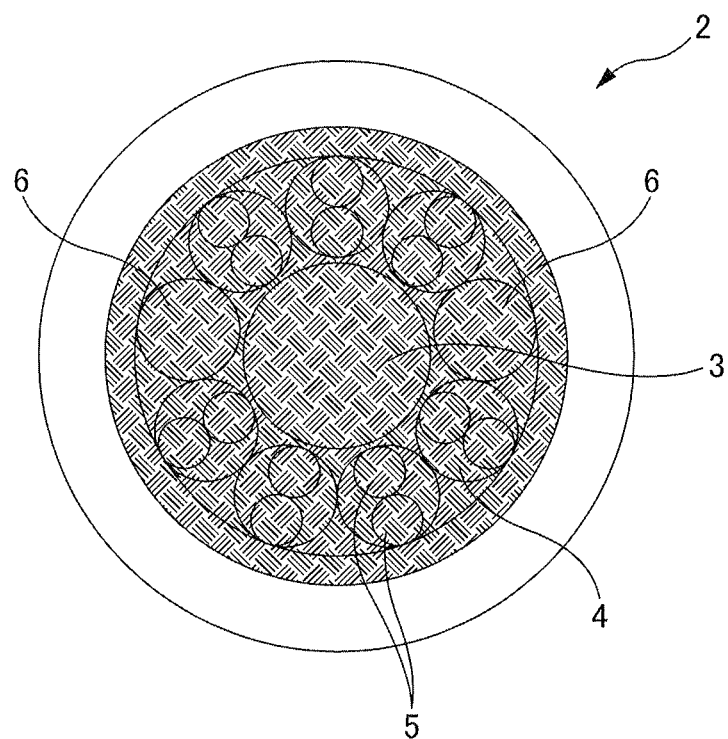
FIG. 3 is a cross-sectional view of a composite cable 2 used in this embodiment.

FIG. 3 is a cross-sectional view of the composite cable 2 that is used in this embodiment.

The composite cable 2 includes a single optical fiber 3, seven differential signal lines 4, and two power supply lines 6. The optical fiber 3 transmits optical signals. In the following description, a primary-coated optical fiber, a secondary-coated optical fiber, an optical fiber cord, and the like may also be referred to simply as "optical fiber". Each differential signal line 4 is composed of a metal cable including a set of two signal lines 5. Thus, the composite cable 2 includes a total of fourteen signal lines 5. These differential signal lines 4 mainly transmit control signals, and so they transmit signals of lower frequencies than in the case of transmitting video signals. The two power supply lines 6 are each composed of a metal cable that is thicker than the signal lines 5, and the potential of one power supply line 6 is 12 V, while the potential of the other power supply line 6 is GND.

Figure 4:
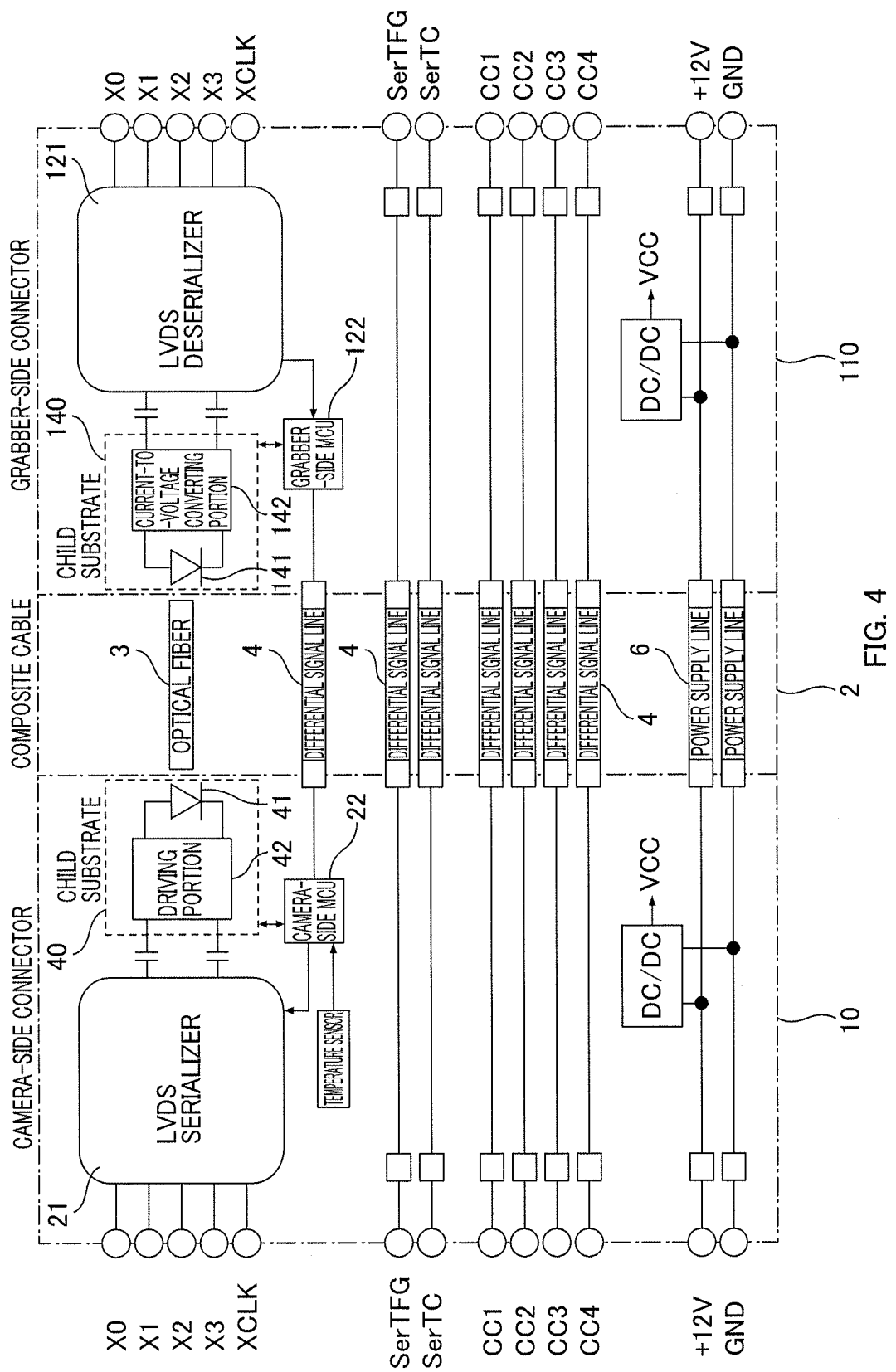
FIG. 4 is a functional block diagram of the connectored cable 1 of this embodiment.

FIG. 4 is a functional block diagram of the connectored cable 1 of this embodiment.

The camera-side connector 10 includes a light-emitting portion 41, a driving portion 42, an LVDS serializer 21, and a camera-side MCU 22.

The light-emitting portion 41 is a laser diode (LD). As the light-emitting portion 41 in this embodiment, employed is a Vertical Cavity Surface Emitting Laser (VCSEL), which emits light perpendicular to a substrate. The light-emitting portion 41 is driven by a current signal and outputs an optical signal to the optical fiber 3, the current signal being the sum of a bias current and a modulation current output from the driving portion 42.

The LVDS serializer 21 multiplexes by a time-division method four video signals (X0 to X3) and a clock signal (XCLK) for the video signals, and converts those signals into a serial signal. An optical signal corresponding to this serial signal is transmitted through the optical fiber 3.

The camera-side MCU 22 performs, for example, (1) acquiring temperature data and bias current data, the temperature data being indicative of the ambient temperature of the light-emitting portion 41, the bias current data being the monitor information of the magnitude of the bias current output to the light-emitting portion 41, (2) sending the temperature data and the bias current data to a grabber-side MCU 122 through a differential signal line 4, (3) acquiring from the grabber-side MCU 122 through a differential signal line 4 setting data of the bias current and setting data of the modulation current, for controlling the intensity of an optical signal originating from the light-emitting portion 41, (4) setting the bias current and the modulation current of the light-emitting portion 41 based on the setting data of the bias current and the setting data of the modulation current, (5) acquiring from the grabber-side MCU 122 through a differential signal line 4 a LOCK signal which provides a notice that regeneration of a received clock at an LVDS deserializer 121 of the grabber-side connector 110 has been completed, and (6) outputting the LOCK signal to the LVDS serializer 21.

The grabber-side connector 110 includes a light-receiving portion 141, a current-to-voltage converting portion 142, the LVDS deserializer 121, and the grabber-side MCU 122.

The light-receiving portion 141 is a photodiode (PD). In this embodiment, a GaAs PIN photodiode (PIN-PD) is adopted as the light-receiving portion 141.

The current-to-voltage converting portion 142 outputs to the LVDS deserializer 121 a voltage signal corresponding to a current supplied from the light-receiving portion 141. Moreover, the current-to-voltage converting portion 142 outputs to the grabber-side MCU 122 a monitor voltage corresponding to the current supplied from the light-receiving portion 141.

The LVDS deserializer 121 generates four video signals (X0 to X3) and a clock signal (XCLK) for the video signals based on the voltage signal (serial signal) input from the current-to-voltage converting portion 142, and outputs the generated signal to a grabber (not shown).

The grabber-side MCU 122 performs, for example, (1) detecting the state (normal or abnormal) of the light-emitting portion 41 by monitoring the monitor voltage, (2) acquiring a LOCK signal from the LVDS deserializer 121 and sending the LOCK signal to the camera-side MCU 22 through the differential signal line 4, (3) acquiring the temperature data and the bias current data from the camera-side MCU 22 through the differential signal line 4, and (4) generating the setting data of the bias current and the setting data of the modulation current based on the temperature data and the bias current data, and sending the generated setting data to the camera-side MCU 22 through the differential signal line 4.

In order to provide the camera-side connector 10 and the grabber-side connector 110 with the functionality shown in FIG. 4, it is required that both the optical fiber 3 and the metal cables (the differential signal lines 4 and the power supply lines 6) are connected to substrates within the respective connectors. In this embodiment, to facilitate connecting operations of the optical fiber 3 and of the metal cables, child substrates to which the optical fiber 3 is connected are prepared in addition to parent substrates to which the metal cables are connected. Moreover, the child substrates to which the optical fiber 3 has been connected are installed on (connected to) the respective parent substrates to which the metal cables have been connected.

It should be noted that, the light-emitting portion 41 serving as a photoelectric conversion portion is mounted on the child substrate of the camera-side connector 10. Moreover, the light-receiving portion 141 serving as a photoelectric conversion portion is mounted on the child substrate of the grabber-side connector 110.

Camera-Side Connector 10
Configuration

Figure 5:
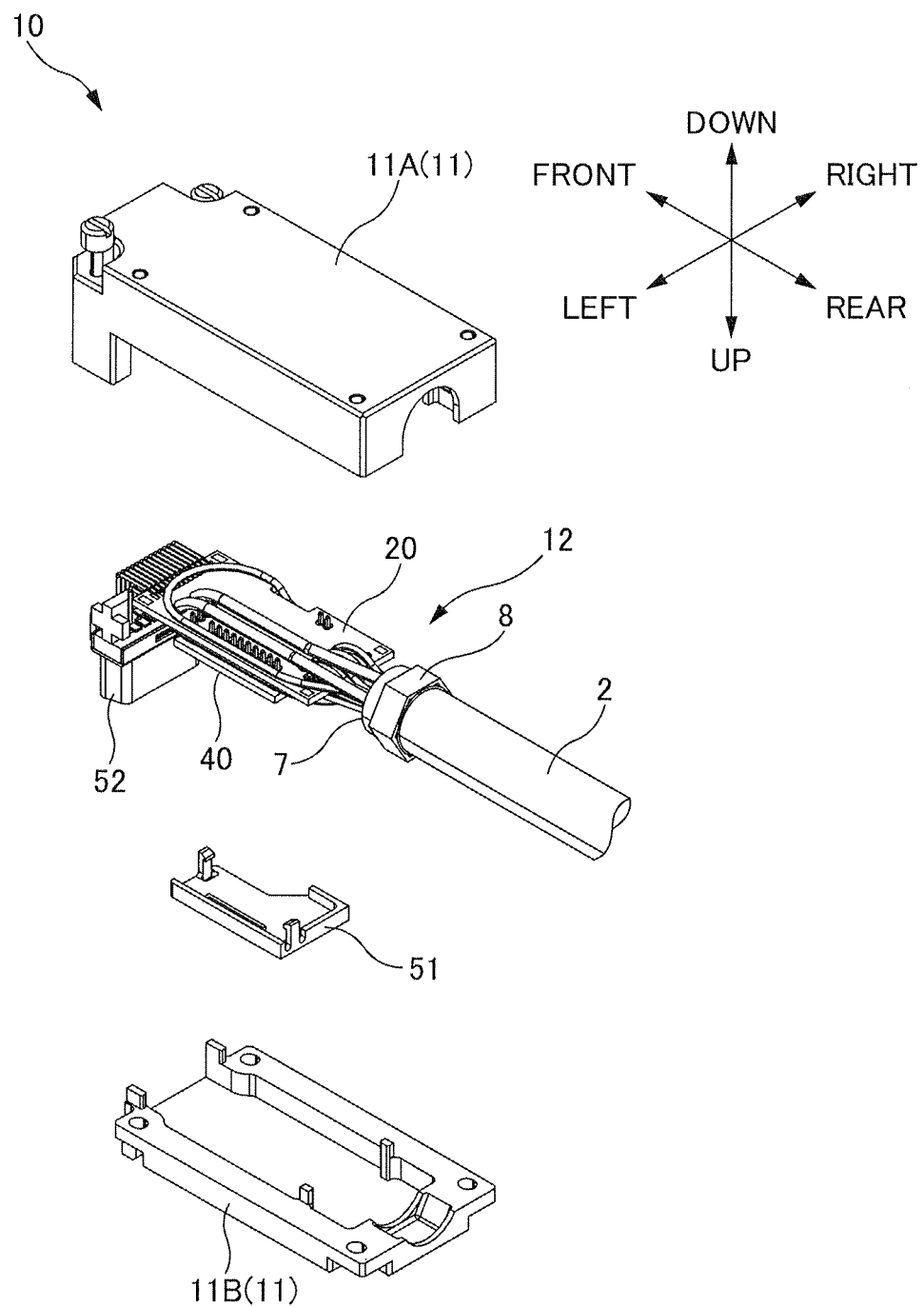
FIG. 5 is an exploded perspective view of a camera-side connector 10.

FIG. 5 is an exploded perspective view of the camera-side connector 10. The camera-side connector 10 includes a housing 11 and a termination portion 12.

The housing 11 is for covering the termination portion 12, which is an electronic component. An inlet for introducing the composite cable 2 into the housing 11 is formed in the housing 11. A caulking member 8 in the vicinity of a stripping portion 7 of the composite cable 2 is held in the inlet of the housing 11. The housing 11 has a case 11A and a cover 11B. The case 11A accommodates the termination portion 12; after placing the termination portion 12 in the case 11A, an accommodating portion of the case 11A is covered with the cover 11B, and then the case 11A and the cover 11B are fastened to each other by screws.

The termination portion 12 includes a parent substrate 20, a child substrate 40, and a terminal portion 52. The parent substrate 20 and the child substrate 40 are each a printed circuit board and achieve the respective functionalities shown in FIG. 3. The configurations of the parent substrate 20 and the child substrate 40 will be described later. To one end side of the parent substrate 20, connected is the terminal portion 52, which includes a 26-pin connector. On the other end side of the parent substrate 20, the composite cable 2 is disposed.

In the following description of the camera-side connector 10, the directions, front, rear, up, down, left, and right are defined as indicated in the drawing. That is to say, the direction of the composite cable 2 when extending straight from the camera-side connector 10 is defined as the "front-rear direction", a direction of the composite cable 2 as seen from the camera-side connector 10 is defined as "rear", and the opposite direction is defined as "front". Moreover, the direction perpendicular to the parent substrate 20 is defined as the "up-down direction", a direction of the child substrate 40 (the side on which the light-emitting portion 41 serving as a photoelectric conversion portion is present) as seen from the parent substrate 20 is defined as "up", and the opposite direction is defined as "down" (in this drawing, the positional relationship is upside down). Moreover, the direction that is perpendicular to the front-rear direction and the up-down direction is defined as the "left-right direction", and "right" and "left" are defined as indicated in the drawing (the right-hand side as seen from the front side in a state in which "up" is facing upward and "down" is facing downward in the up-down direction is defined as "right", and the left-hand side is defined as "left").

Configuration of Parent Substrate 20

Figure 6:
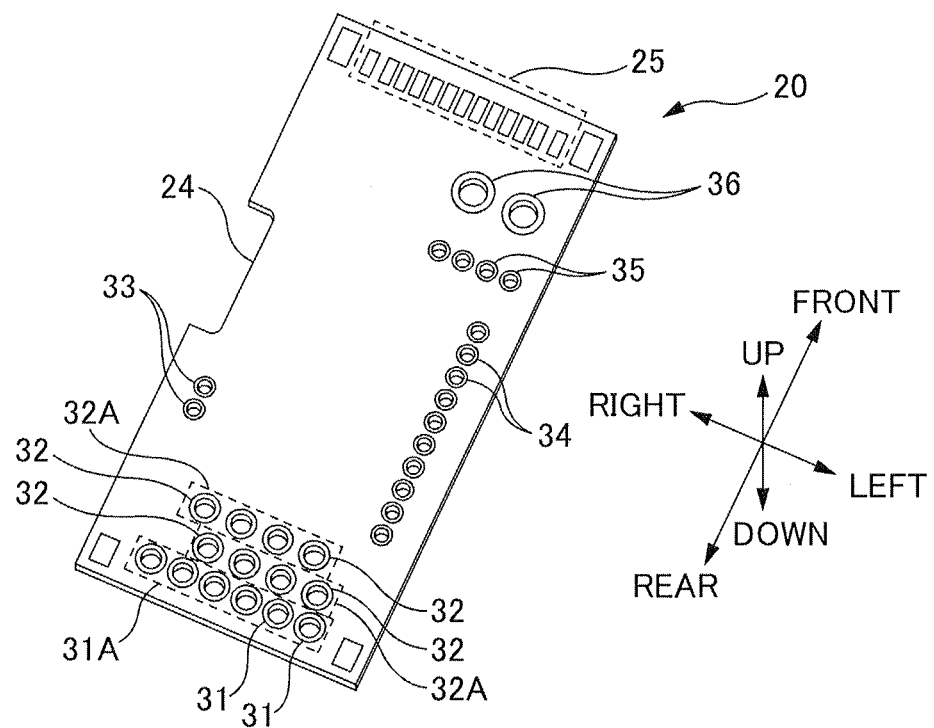
FIG. 6 is a perspective view of a parent substrate 20.

FIG. 6 is a perspective view of the parent substrate 20.

There are three rows (through hole rows) of through holes that are aligned in the left-right direction on the rear side (the composite cable 2 side) of the parent substrate 20. The rearmost through hole row of the three through hole rows may be referred to as "rear-side through hole row 31A", and the other two through hole rows which are placed forward of the rear-side through hole row 31A are referred to as "front-side through hole rows 32A".

The rear-side through hole row 31A consists of six through holes. These six through holes may be referred to as "rear-side through holes 31". The front-side through hole rows 32A each consist of four through holes. The through holes of the front-side through hole rows 32A may be referred to as "front-side through holes 32".

Thus, there is provided a total of fourteen through holes (i.e., the six rear-side through holes 31 and the eight front-side through holes 32) on the rear side of the parent substrate 20. These through holes are the through holes for soldering of the signal lines 5 constituting the differential signal lines 4 of the composite cable 2.

A recess 24 is formed on the right edge of the parent substrate 20. When the parent substrate 20 is stored in the housing 11, there is almost no space between the inner surface of the housing 11 and the left and right edges of the parent substrate 20, but in the recess 24, a space is created between the parent substrate 20 and the inner surface of the housing 11. The optical fiber 3 is wired through this space, and this makes it possible to secure an extra length of the optical fiber 3 on both upper and lower sides of the parent substrate 20 (wiring of the optical fiber 3 will be described later).

Two through holes 33 for a 2-pin header are formed on the right side of the parent substrate 20, aligned in the front-rear direction. These two through holes are formed at a distance of a predetermined length from the right edge of the parent substrate 20, so that when the parent substrate 20 is stored in the case 11A of the housing 11, the optical fiber 3 can be wired between a 2-pin header 61 and the inner surface of the housing 11.

Ten through holes 34 for a 10-pin header are formed on the left side of the parent substrate 20, aligned in the front-rear direction. The ten through holes are formed at a distance of a predetermined length from the left edge of the parent substrate 20, so that when the parent substrate 20 is stored in the case 11A of the housing 11, the optical fiber 3 can be wired between a 10-pin header 62 (not shown) and the inner surface of the housing 11.

Four through holes 35 for a 4-pin header and two through holes 36 for soldering of the power supply lines 6 of the composite cable 2 are formed in the parent substrate 20. The through holes 36 for the power supply lines are located closest to a connecting portion 25 to which the terminal portion 52 is connected. The purpose of this is to minimize the power supply wiring pattern on the parent substrate 20. Reducing the power supply wiring pattern reduces the number of portions at which the clearance from the signal pattern should be taken into account, and it is therefore possible to reduce the size of the substrate.

Configuration of Child Substrate 40

Figure 7:
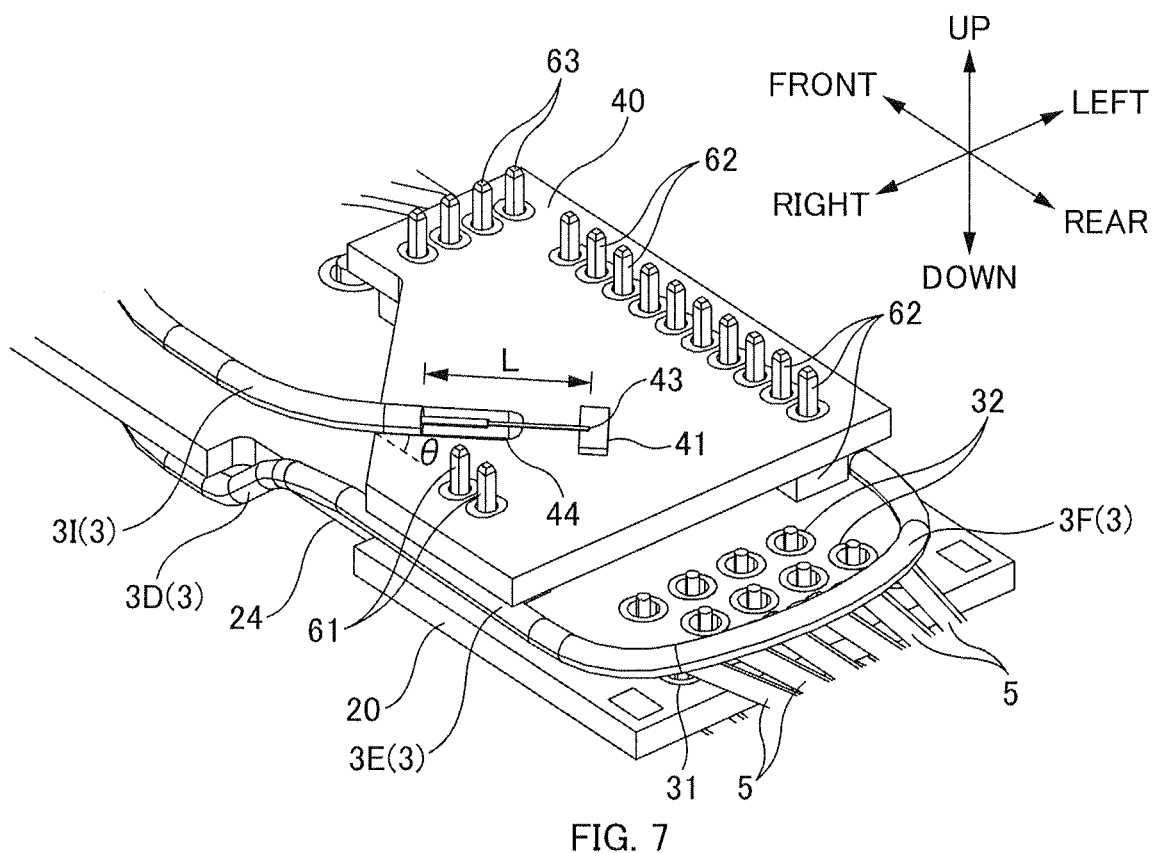
FIG. 7 is a perspective view of a child substrate 40 and its surroundings as seen obliquely from above.

FIG. 7 is a perspective view of the child substrate 40 and its surroundings as seen obliquely from above. On the child substrate 40, installed are mainly optical components (the light-emitting portion 41 and the driving portion 42 (not shown in FIG. 7) thereof). The light-emitting portion 41 installed on the child substrate 40 is optically coupled to an end face of the optical fiber 3.

The child substrate 40 is installed on the upper side of the parent substrate 20 with the 2-pin header 61, the 10-pin header 62, and the 4-pin header 63. For this purpose, the child substrate 40 also has through holes for a 2-pin header, through holes for a 10-pin header, and through holes for a 4-pin header formed thereon.

The child substrate 40 has a recessed portion 44 formed thereon. The recessed portion 44 is a cut that is formed to avoid interference of a coating of the secondary-coated optical fiber of the optical fiber 3 with the child substrate 40 when optically coupling the end face of the optical fiber 3 to the light-emitting portion 41. The width of the recessed portion 44 is set to be wider than the outer diameter, 900 µm, of the optical fiber 3 (including the coating of the secondary-coated optical fiber). Thus, the length L from the end face of the optical fiber 3 to the coating of the secondary-coated optical fiber can be reduced, and damage to the optical fiber 3 can be suppressed. Moreover, a portion of the coating of the optical fiber 3 can be positioned in the recessed portion 44, so that the child substrate 40 and the coating of the optical fiber 3 can be fixed to each other by bonding (this will be described later).

The recessed portion 44 is obliquely formed with respect to the front-rear direction and the left-right direction. That is to say, the cutting direction of the recessed portion 44 has a relationship of $0°<\theta<90°$ with respect to the front-rear direction. Preferably, the cutting direction of the recessed portion 44 has a relationship of $30°<\theta<60°$ with respect to the front-rear direction. Here, the cutting direction of the recessed portion 44 is slanted at an angle of 45° with respect to the front-rear direction.

Thus, the recessed portion 44 is formed so that an opening portion thereof faces the right front side. As a result, when the child substrate 40 is stored in the housing 11, the opening portion of the recessed portion 44 faces the inner surface of the right side of the housing 11 (the inner surface of the right side of the case 11A). Obliquely forming the recessed portion 44 enables the optical fiber 3 to connect to the child substrate 40 in such a manner that it forms an acute angle with respect to the front-rear direction.

The light-emitting portion 41 is mounted on the extension of the recessed portion 44. The light-emitting portion 41 is optically coupled to the end face of the optical fiber 3, which is guided along the recessed portion 44 onto the child substrate 40.

Figure 8A:
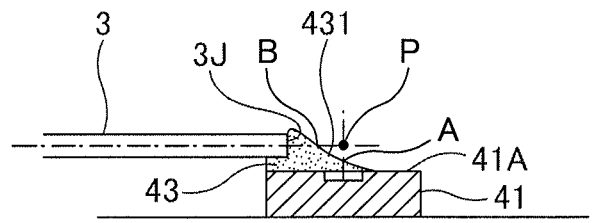
FIG. 8A is an explanatory diagram of an optical coupling portion 43 that optically couples a light-emitting portion 41 and an optical fiber 3.

FIG. 8A is an explanatory diagram of an optical coupling portion 43 that optically couples the light-emitting portion 41 and the optical fiber 3 to each other. The optical axis of the optical fiber 3 is approximately parallel to the child substrate 40, and the optical axis of the light-emitting portion 41 is approximately perpendicular to the plane of the child substrate 40. Therefore, these optical axes are arranged approximately perpendicular to each other. It should be noted that the structure and the like of the optical coupling portion 43 are also described in JP 2010-237642A and WO 2011/83812.

The optical coupling portion 43 is composed of a resin that is transparent to the transmitted light. However, since the optical path within the resin through which the light is transmitted is short, it is sufficient that the resin is to some extent transparent. The optical coupling portion 43 covers the entire end face 3J of the optical fiber 3 and is attached up to an upper portion of the optical fiber 3. However, it is sufficient to cover the entire cross section of the core of the optical fiber 3 with the optical coupling portion 43, and it is not necessarily required that it completely covers the end face 3J of the optical fiber 3. Similarly, it is sufficient to cover a light-emitting face 41A of the light-emitting portion 41 with the optical coupling portion 43, and it is not necessarily required that it completely covers the light-emitting portion 41.

An outer surface 431 of the optical coupling portion 43 serves as an interface between the transparent resin composing the optical coupling portion 43 and outside gases (air, nitrogen, and the like). The light emitted from the light-emitting portion 41 is reflected from the outer surface 431 and enters the optical fiber 3. The transparent resin composing the optical coupling portion 43 is not present in the position of an intersection P at which the optical axis of the optical fiber 3 and the optical axis of the light-emitting portion 41 intersect each other. The outer surface 431 of the optical coupling portion 43 has a concave shape that is recessed toward the end face 3J of the optical fiber 3 and the light-emitting face 41A of the light-emitting portion 41. Specifically, the shape of the outer surface 431 of the optical coupling portion 43 is concave at a position A opposing the light-emitting face 41A of the light-emitting portion 41 and at a position B opposing the end face of the optical fiber 3, and is also concave between the positions A and B.

Since the transparent resin composing the optical coupling portion 43 is not present in the position of the intersection P at which the optical axis of the light-emitting portion 41 and the optical axis of the optical fiber 3 intersect each other, the range of light diffusion is narrowed, so that loss can be reduced. Moreover, since the outer surface 431 of the optical coupling portion 43 has a concave shape, it is no longer necessary to precisely control the position and the angle of the outer surface 431 serving as a reflection surface, and reliable optical coupling can be realized with lower manufacturing precision. Moreover, since the end face 3J of the optical fiber 3 and the light-emitting portion 41 are optically coupled to each other by the optical coupling portion 43 composed of a single transparent resin, manufacturing is possible at an extremely low cost and through a simple manufacturing process.

Figure 8B:
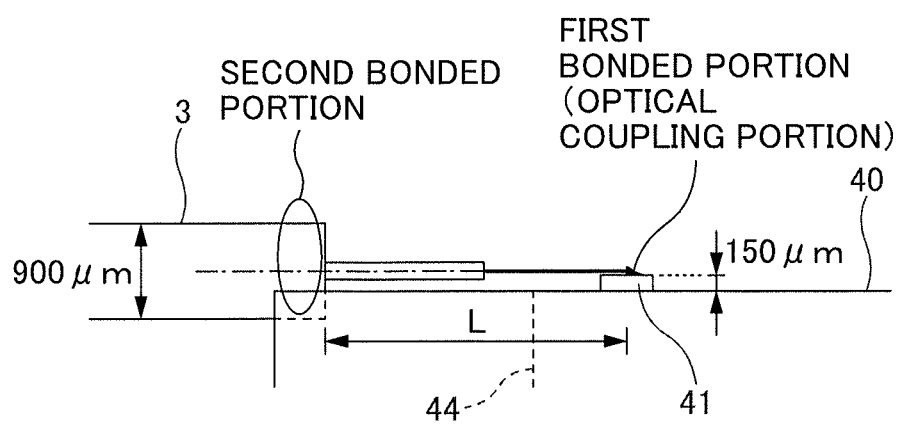
FIG. 8B is an explanatory diagram of bonded portions on an end portion of the optical fiber 3.

FIG. 8B is an explanatory diagram of bonded portions of the end portion of the optical fiber 3. At least two portions of the end portion of the optical fiber 3 are fixed by bonding.

A first bonded portion is a portion at which the end face 3J of the optical fiber 3 and the light-emitting portion 41 are fixed to each other by bonding. The transparent resin composing the above-described optical coupling portion 43 serves as an adhesive, thereby composing the first bonded portion. For this purpose, a material having the function of composing the optical coupling portion 43 and the function of an adhesive is adopted as the transparent resin for the first bonded portion. For example, a UV curing resin, a thermosetting resin, or the like can be used as the transparent resin. Specific examples thereof include an acrylic resin, an epoxy resin, and a silicone resin.

A second bonded portion is a portion at which the coating of the optical fiber 3 and the child substrate 40 are fixed to each other by bonding. By fixing at this portion, movement of the end portion of the optical fiber 3 is suppressed, and the breakage of the optical coupling portion 43 is suppressed. It should be noted that the simple configuration of the optical coupling portion 43 as shown in FIG. 8A causes the optical axis of the optical fiber 3 to be close to the surface of the child substrate 40, but interference of the optical fiber 3 (having an outer diameter of 900 µm) with the child substrate 40 is avoided because of the recessed portion 44 formed in the child substrate 40. Therefore, a portion of the coating of the optical fiber 3 can be positioned in the recessed portion 44. Thus, at the second bonded portion, the coating of the optical fiber 3 and the child substrate 40 can be bonded to each other. It should be noted that, for example, a thermoplastic resin or the like can be used as an adhesive for the second bonded portion. Specific examples thereof include a silicone resin and an epoxy resin. Unlike the transparent resin for the first bonded portion, the adhesive for the second bonded portion is not required to have the function of transmitting light.

Wiring of Optical Fiber 3

Next, wiring of the optical fiber 3 will be described. It is necessary to set the bend radius to be greater than a permissible bend radius and to accommodate the optical fiber 3 within a narrow connector (within the housing 11).

Figure 9:
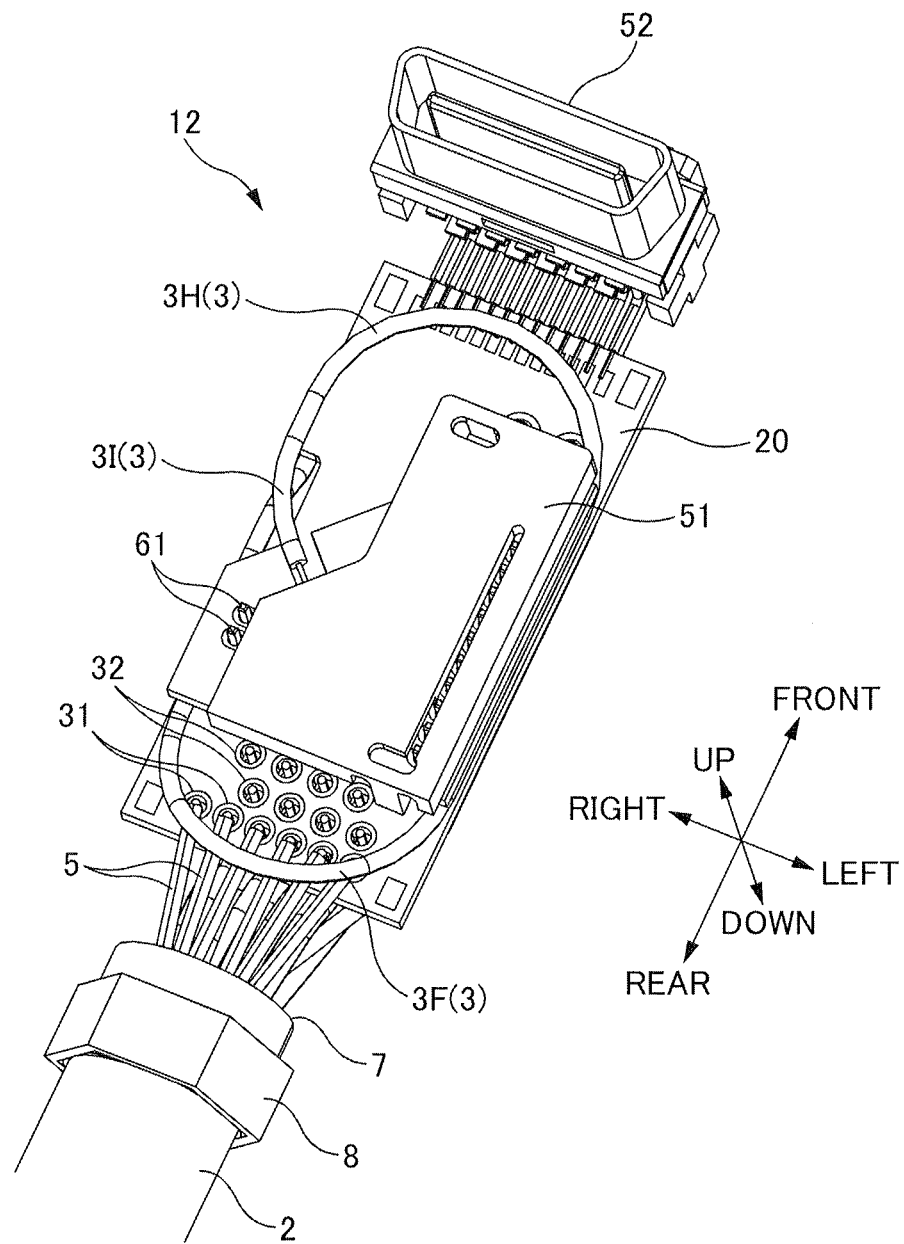
FIG. 9 is a perspective view of a termination portion 12 of the camera-side connector 10 as seen obliquely from above.
Figure 10:
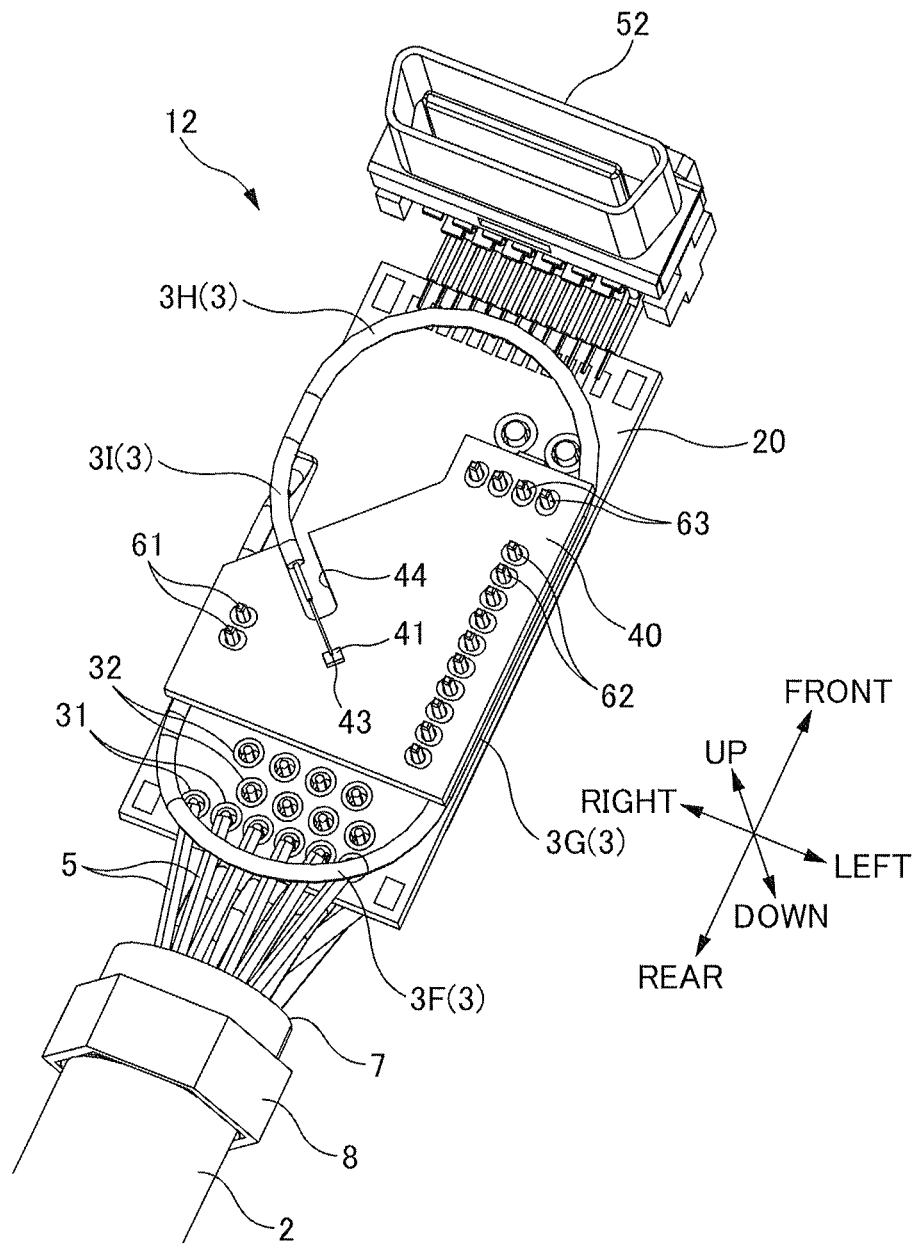
FIG. 10 shows a state in which a protective cover 51 shown in FIG. 9 has been removed.
Figure 11:
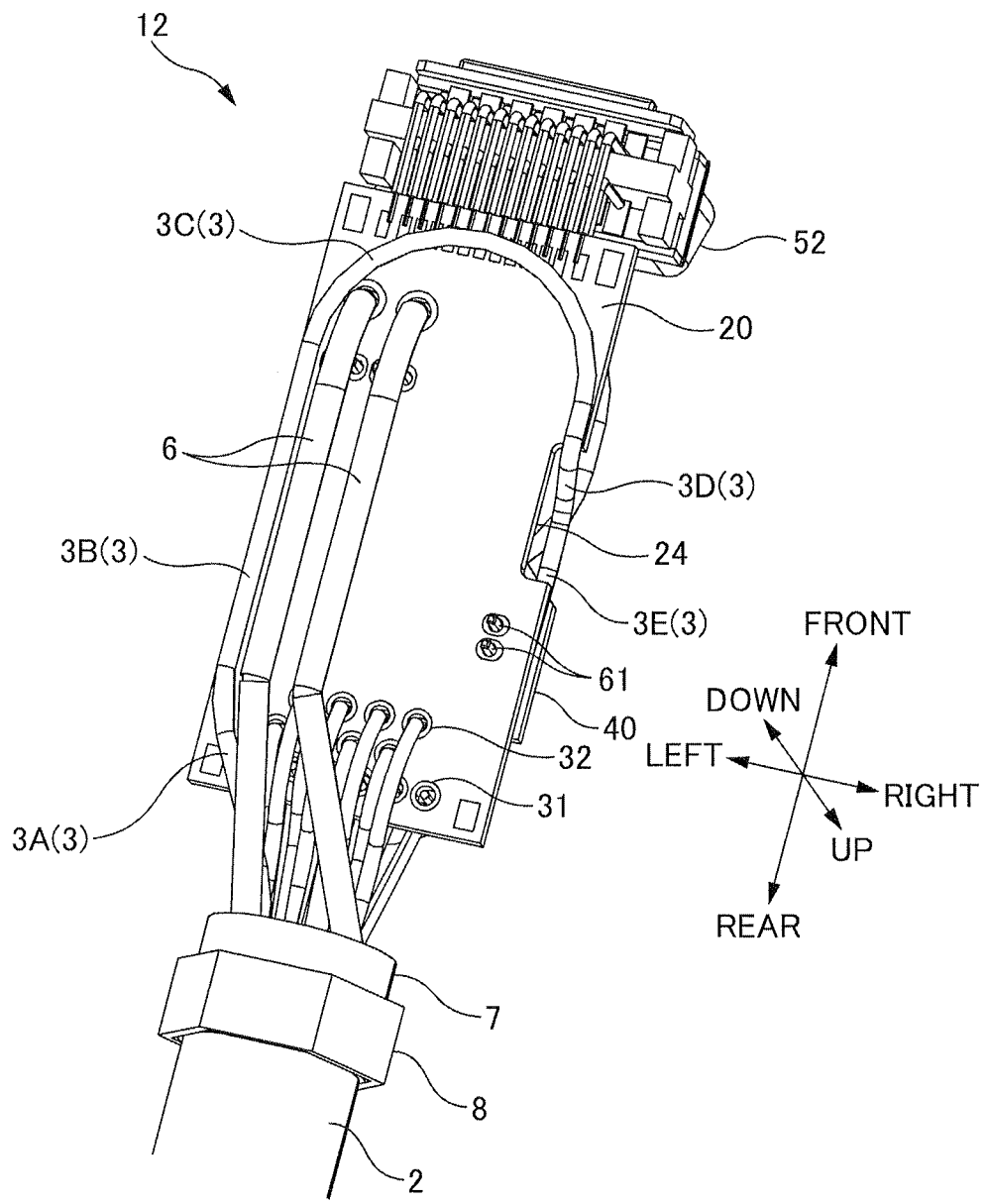
FIG. 11 is a perspective view of the termination portion 12 of the camera-side connector 10 as seen obliquely from below.
Figure 12A:
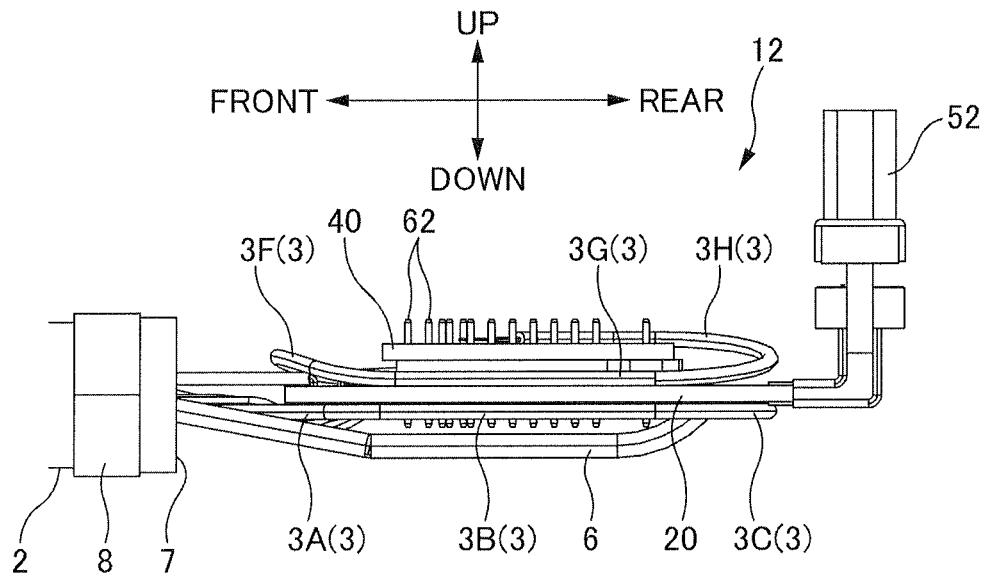
FIG. 12A is a side view of the termination portion 12 as seen from the left.
Figure 12B:
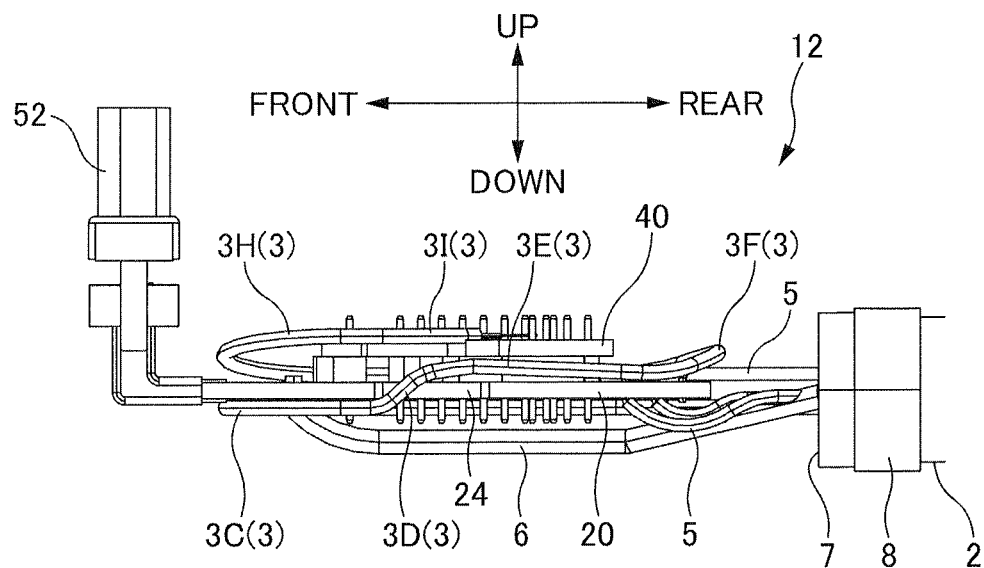
FIG. 12B is a side view of the termination portion 12 as seen from the right.

FIG. 9 is a perspective view of the termination portion 12 of the camera-side connector 10 as seen obliquely from above. FIG. 10 shows a state in which a protective cover 51 shown in FIG. 9 has been removed. FIG. 11 is a perspective view of the termination portion 12 of the camera-side connector 10 as seen obliquely from below. FIG. 12A is a side view of the termination portion 12 as seen from the left. FIG. 12B is a side view of the termination portion 12 as seen from the right.

Here, various portions of the optical fiber 3 within the housing 11 may be referred to as follows: a base portion 3A; a lower-side linear portion 3B; a first front-side bent portion 3C; a transition portion 3D; a first upper-side linear portion 3E, a rear-side bent portion 3F; a second upper-side linear portion 3G; a second front-side bent portion 3H; and a leading end portion 3I, in this order from the stripping portion 7 of the composite cable 2 toward the end portion of the optical fiber 3. The base portion 3A is a portion between the stripping portion 7 and the lower-side linear portion 3B. The lower-side linear portion 3B is a portion that is wired approximately linearly on the left lower side of the parent substrate 20. The first front-side bent portion 3C is a bent portion that is bent into a U shape on the front lower side of the parent substrate 20. The transition portion 3D is a portion that is connected from the lower side to the upper side of the parent substrate 20 in the recess 24 of the parent substrate 20. The first upper-side linear portion 3E is a portion between the transition portion 3D and the rear-side bent portion 3F and is wired approximately linearly on the right upper side of the parent substrate 20. The rear-side bent portion 3F is a bent portion that is bent into a U shape on the rear upper side of the parent substrate 20. The second upper-side linear portion 3G is a portion between the rear-side bent portion 3F and the second front-side bent portion 3H and is wired approximately linearly on the left upper side of the parent substrate 20. The second front-side bent portion 3H is a bent portion that is bent into a U shape on the front upper side of the parent substrate 20. The leading end portion 3I is a portion between the second front-side bent portion 3H and the optical coupling portion 43.

The extra length of the optical fiber 3 is managed by approximately two loops within the housing 11. Thus, the optical fiber 3 is routed within the housing 11 so that the orientation thereof in the front-rear direction is changed three times. As a result, the optical fiber 3 within the housing 11 has three bent portions (the first front-side bent portion 3C, the rear-side bent portion 3F, and the second front-side bent portion 3H) that are bent into a U shape. These bent portions that are bent into a U shape prevent any tension applied to the composite cable 2 from being conveyed to the optical coupling portion 43 at the end portion of the optical fiber 3, and therefore damage to the optical fiber 3 and the optical coupling portion 43 can be suppressed.

Since the optical fiber 3 is inserted from the rear side of the housing 11 while managing the extra length of two loops, two bent portions (the first front-side bent portion 3C and the second front-side bent portion 3H) of the three bent portions are located on the front side. If wiring is performed in the state where these two bent portions are stacked, the bent portions become bulky in the up-down direction. Moreover, the optical fiber 3 that is bulky in the up-down direction is likely to move within the housing 11 and causes a failure, such as damage to the optical coupling portion 43.

To address this issue, in this embodiment, one of the two bent portions on the front side (the first front-side bent portion 3C) is positioned on the lower side of the parent substrate 20, and the other bent portion (the second front-side bent portion 3H) is positioned on the upper side of the parent substrate 20. That is to say, the optical fiber 3 is wired in such a manner that the two bent portions on the front side are separated to the upper side and the lower side of the parent substrate 20. In other words, the optical fiber 3 is wired in such a manner that the two bent portions on the front side are positioned on opposite sides of the parent substrate 20. Thus, portions of the optical fiber 3 can avoid being stacked on both of the upper side and the lower side of the parent substrate 20. Moreover, since the portions of the optical fiber 3 are not stacked, it is easy to immovably hold the optical fiber 3.

In order to manage of the extra length of the optical fiber 3 on both of the upper side and the lower side of the parent substrate 20, the recess 24 is formed in the parent substrate 20. The recess 24 has a space formed between the parent substrate 20 and the inner surface of the housing 11. The transition portion 3D of the optical fiber 3 passes through this space, thereby the extra length of the optical fiber 3 are connected between the upper side and the lower side of the substrate.

The lower-side linear portion 3B of the optical fiber 3 is wired outward (left) from the 10-pin header 62 and the power supply lines 6 (see FIGS. 11 and 12A). Thus, the lower-side linear portion 3B is restrained in the left-right direction between the housing 11 and both of the 10-pin header 62 and the power supply lines 6. As a result, movement of the optical fiber 3 within the housing 11 is restricted.

The first upper-side linear portion 3E of the optical fiber 3 is wired outward (right) from the 2-pin header 61 (see FIGS. 7, 9, 10, and 12B). Thus, the first upper-side linear portion 3E is restrained in the left-right direction between the housing 11 and the 2-pin header 61. Furthermore, the first upper-side linear portion 3E is wired between the parent substrate 20 and the child substrate 40 and is therefore restrained in the up-down direction as well. Accordingly, movement of the first upper-side linear portion 3E in the left-right direction and the up-down direction is restricted.

The second upper-side linear portion 3G of the optical fiber 3 is wired outward (left) from the 10-pin header 62 (see FIG. 10). Thus, the second upper-side linear portion 3G is restrained in the left-right direction between the housing 11 and the 10-pin header 62. Furthermore, the second upper-side linear portion 3G is wired between the parent substrate 20 and the child substrate 40 and is therefore restrained in the up-down direction as well. Accordingly, movement of the second upper-side linear portion 3G in the left-right direction and the up-down direction is restricted.

The length of that portion of the second upper-side linear portion 3G that is restrained in the left-right direction and the up-down direction is longer than the restrained portion of the first upper-side linear portion 3E. Therefore, the second upper-side linear portion 3G is unlikely to move within the housing 11. That is to say, the second upper-side linear portion 3G, which is closer to the end of the optical fiber 3 than the first upper-side linear portion 3E is, is less movable than the first upper-side linear portion 3E. Thus, damage to the optical coupling portion 43 that is caused by movement of the end of the optical fiber 3 within the housing 11 can be suppressed.

In order to suppress damage to the optical coupling portion 43 by increasing as much as possible the length of the second upper-side linear portion 3G (increasing the length of the restrained portion), which is closer to the end of the optical fiber 3, the rear-side bent portion 3F is disposed on the upper side of the parent substrate 20 (the side on which the child substrate 40 is mounted). Moreover, in order to dispose the rear-side bent portion 3F on the upper side of the parent substrate 20, the transition portion 3D (and the recess 24 of the parent substrate 20) is disposed opposite the second upper-side linear portion 3G (on the right side) in the left-right direction.

Figure 13:
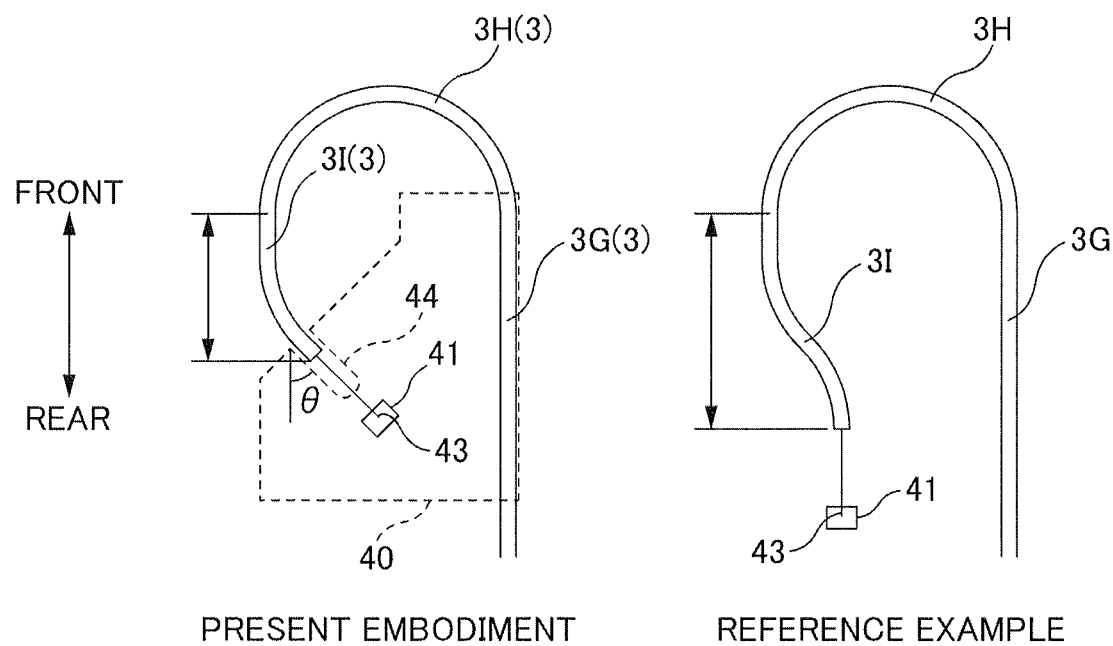
FIG. 13 is an explanatory diagram of a leading end portion 3I of the optical fiber 3 according to the embodiment and a reference example.

FIG. 13 is an explanatory diagram showing the leading end portion 3I of the optical fiber 3 according to this embodiment and a comparative example.

The optical fiber 3 is bent into a U shape within the narrow housing 11, and the starting point and the end point of the bent portion are both located very near the inner surface of the housing 11. On the other hand, in order to mount the light-emitting portion 41 on the child substrate 40, the optical coupling portion 43 needs to be positioned at a distance from the inner surface of the housing 11. For this reason, the leading end portion 3I beyond the second front-side bent portion 3H needs to be wired from a position near the inner surface of the housing 11 to a position away from the inner surface of the housing 11.

In the comparative example, the direction of optical fiber 3 in the optical coupling portion 43 is parallel to the front-rear direction. Thus, in the comparative example, the leading end portion 3I of the optical fiber 3 beyond the second front-side bent portion 3H needs to be bent twice. Consequently, in the comparative example, there is the necessity to increase the length of the leading end portion 3I in the front-rear direction, which results in increase of the length of the camera-side connector 10 in the front-rear direction.

In contrast, in this embodiment, the direction of the optical fiber 3 in the optical coupling portion 43 is slanted at an angle θ with respect to the front-rear direction (θ is an acute angle (within a range of 0°<θ<90°), and is 45° in this example). Thus, in this embodiment, it is sufficient to bend only once the leading end portion 3I of the optical fiber 3, which is beyond the second front-side bent portion 3H. Accordingly, in this embodiment, it is possible to reduce the length of the leading end portion 3I in the front-rear direction, and it is possible to reduce the size of the camera-side connector 10.

In order to eliminate the need to bend the leading end portion 3I of the optical fiber 3 more than once, the cutting direction of the recessed portion 44 in the child substrate 40 is slanted at an angle θ (45° in this example) with respect to the front-rear direction. Thus, the end face of the optical fiber 3 and the light-emitting portion 41 are optically coupled to each other in such a manner that the optical fiber 3 forms an acute angle with respect to the front-rear direction in the optical coupling portion 43.

Moreover, in the comparative example, the leading end portion 3I of the optical fiber 3 is bent into an S shape, and the leading end portion 3I of the optical fiber 3 is bent in different directions at the two positions (when seen from above as shown in FIG. 13, the optical fiber 3 is bent counterclockwise at one position and clockwise at the other position with respect to the direction toward the end face of the optical fiber 3). As in this comparative example, if portions that are bent in different directions are adjacent, the optical fiber 3 is more likely to move. For this reason, in the comparative example, it is necessary to increase the number of supporting points (e.g., bonding) for stably storing the optical fiber 3 or other means.

In contrast, in this embodiment, since the leading end portion 3I of the optical fiber 3 is bent only once, there is no chance that portions that are bent in different directions are adjacent to each other in the leading end portion 3I. Thus, the leading end portion 3I of the optical fiber 3 is less movable than that in the comparative example.

Furthermore, in this embodiment, the direction in which the leading end portion 3I of the optical fiber 3 is bent is the same as the direction in which the second front-side bent portion 3H of the optical fiber 3 is bent. When seen from above as shown in FIG. 13, both the second front-side bent portion 3H and the leading end portion 3I of the optical fiber 3 are bent counterclockwise with respect to the direction toward the end face of the optical fiber 3. That is to say, in this embodiment, the optical fiber 3 is bent in the same direction between the second upper-side linear portion 3G and the optical coupling portion 43 (the second bonded portion in FIG. 8B); the optical fiber 3 in the second upper-side linear portion 3G is restrained in the up-down direction and the left-right direction, and the optical coupling portion 43 is fixed to the optical fiber 3 by bonding. Thus, between the second upper-side linear portion 3G and the optical coupling portion 43 (the second bonded portion in FIG. 8B), a configuration that makes the optical fiber 3 very unlikely to move is achieved because of the bending elastic force of the optical fiber 3.

By wiring the optical fiber 3 as described above, it is possible to stably store long optical fiber 3 within the narrow housing 11 without using a cable clamp and the like or increasing the number of bonded portions.

Arrangement of Signal Lines 5 and Power Supply Lines 6

Next, wiring of the signal lines 5 and the power supply lines 6 will be described using FIGS. 7, 9 to 11, 12A, and 12B.

The fourteen signal lines 5 are connected to the parent substrate 20 by through-hole connection. The reason for employing connection by through-hole connection, and not surface mounting, is to prevent the signal lines 5 from easily disconnecting from the parent substrate 20 even when a tension is applied to the cable 2.

Six signal lines 5 of the fourteen signal lines 5 are respectively connected to the six rear-side through holes 31 by through-hole connection. The end portions of these six signal lines 5 are inserted downward into the rear-side through holes 31 and are soldered. The other eight signal lines 5 are respectively connected to the eight front-side through holes 32 by through-hole connection. End portions of these eight signal lines 5 are inserted upward into the front-side through holes 32 and are soldered.

That is to say, soldering of the rear-side through holes 31 and soldering of the front-side through holes 32 are performed in opposite directions. Thus, the fourteen signal lines 5 can be distributed to both sides of the parent substrate 20, which facilitates the operation for connecting the signal lines 5 in a small region. Moreover, since the signal lines 5 are connected from both sides of the parent substrate 20 by through-hole connection, the signal lines 5 are less likely to disconnect from the parent substrate 20 even when a tension is applied to the signal lines 5.

Furthermore, the end portions of all of the six signal lines 5 connected to the rear-side through holes 31 are inserted downward into the rear-side through holes 31 from above. That is to say, the end portions of these six signal lines 5 are inserted from the upper side of the parent substrate 20, on which the rear-side bent portion 3F of the optical fiber 3 is present. Thus, the rear-side bent portion 3F of the optical fiber 3 does not come into contact with edges of the solder protruding from the rear-side through holes 31, and therefore can be prevented from being damaged. Moreover, the rear-side bent portion 3F is wired above the coatings of the six signal lines 5. Therefore, even if the rear-side bent portion 3F comes into contact with the signal lines 5, the coatings of the signal lines 5 serve as cushioning materials, so that damage is unlikely to occur.

On respective sides of the rear-side bent portion 3F that lies over the coatings of the six signal lines 5, located are the first upper-side linear portion 3E and the second upper-side linear portion 3G; both of the first upper-side linear portion 3E and the second upper-side linear portion 3G are wired so as to be sandwiched between the parent substrate 20 and the child substrate 40. Since the first upper-side linear portion 3E and the second upper-side linear portion 3G is subject to a downward force from the child substrate 40, the rear-side bent portion 3F is likely to be subject to a downward force, which is located between the first upper-side linear portion 3E and the second upper-side linear portion 3G. That is, if an edge of the solder is present below the rear-side bent portion 3F, it is likely to cause damage to the optical fiber 3. Therefore, as in this embodiment, in a configuration in which both of the first upper-side linear portion 3E and the second upper-side linear portion 3G are wired so as to be sandwiched between the parent substrate 20 and the child substrate 40, it is particularly effective in preventing damage to the optical fiber 3 that the rear-side bent portion 3F is located above the coatings of the signal lines 5.

The six signal lines 5 that are connected to the rear-side through holes 31 are connected by through-hole connection without being curved. In contrast, the eight signal lines 5 are connected to the front-side through holes 32 by through-hole connection while being slightly curved (see FIG. 12B). The reasons for this are as follows: (1) when connecting the eight signal lines 5 to the front-side through holes 32, it is necessary to wire those signal lines 5 over the lower side of the edges of the solders which protrude from the rear-side through holes 31, and (2) when the soldering of the rear-side through holes 31 is visually inspected from the lower side of the parent substrate 20, it is necessary to allow the eight signal lines 5 connected to the front-side through holes 32 to be shifted in the left-right direction.

The rear-side bent portion 3F is arranged above the coatings of the six signal lines 5 that are connected to the rear-side through holes 31 by through-hole connection without being curved. Thus, the signal lines 5 and the rear-side bent portion 3F can be wired in such a manner that they do not become bulky in the up-down direction. If the rear-side bent portion 3F is arranged above the coatings of the eight signal lines 5 that are connected to the front-side through holes 32 by through-hole connection while being curved, not only the signal lines 5 and the rear-side bent portion 3F become bulky in the up-down direction, but also the rear-side bent portion 3F is wired at a distance from the parent substrate 20. Therefore, there is a possibility that the optical fiber 3 is likely to move or that the bend radius of the rear-side bent portion 3F decreases.

The two power supply lines 6 are connected by through-hole connection at positions that are closer to the terminal portion 52 than the signal lines 5 are. The purpose of this is to minimize the power supply wiring pattern on the parent substrate 20. Moreover, the two power supply lines 6 are wired over the lower side of the 4-pin header 63. However, coatings of the power supply lines 6 are thick when compared with the coatings of the signal lines 5, and therefore damage due to contact with the pins is unlikely to occur. This is why the above-described wiring manner is permitted.

Grabber-Side Connector 110

Next, the grabber-side connector 110 will be described. The configuration of the grabber-side connector 110 is similar to that of the camera-side connector 10, and so various components of the grabber-side connector 110 are designated by reference numerals obtained by adding 100 to the reference numerals of the corresponding components of the camera-side connector 10, and descriptions of those components may be omitted in some cases.

Configuration

Figure 14:
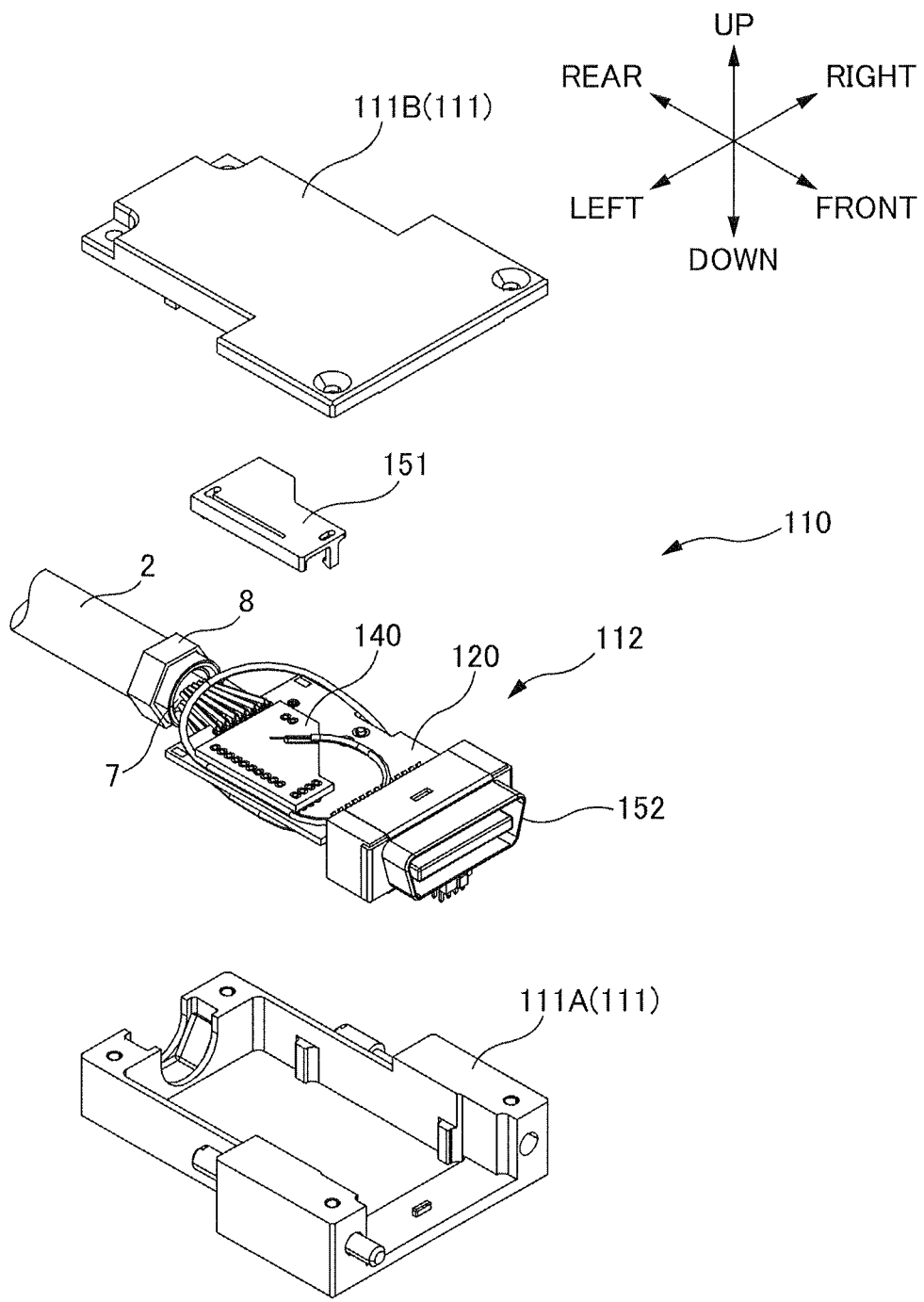
FIG. 14 is an exploded perspective view of a grabber-side connector 110.

FIG. 14 is an exploded perspective view of the grabber-side connector 110.

In the following description of the grabber-side connector 110, the directions, front, rear, up, down, left, and right are defined as indicated in the drawing. That is to say, the direction of the composite cable 2 when extending straight from the grabber-side connector 110 is defined as the "front-rear direction", a direction of the composite cable 2 as seen from the grabber-side connector 110 is defined as "rear", and the opposite direction is defined as "front". Moreover, the direction perpendicular to a parent substrate 120 is defined as the "up-down direction", a direction of the child substrate 140 (the side on which the light-receiving portion 141 serving as a photoelectric conversion portion is present) as seen from the parent substrate 120 is defined as "up", and the opposite direction is defined as "down". Moreover, the direction that is perpendicular to the front-rear direction and the up-down direction is defined as the "left-right direction", and "right" and "left" are defined as indicated in the drawing (the right-hand side as seen from the front side in a state in which "up" is positioned up and "down" is positioned down in the up-down direction is defined as "right", and the left-hand side is defined as "left").

Figure 15:
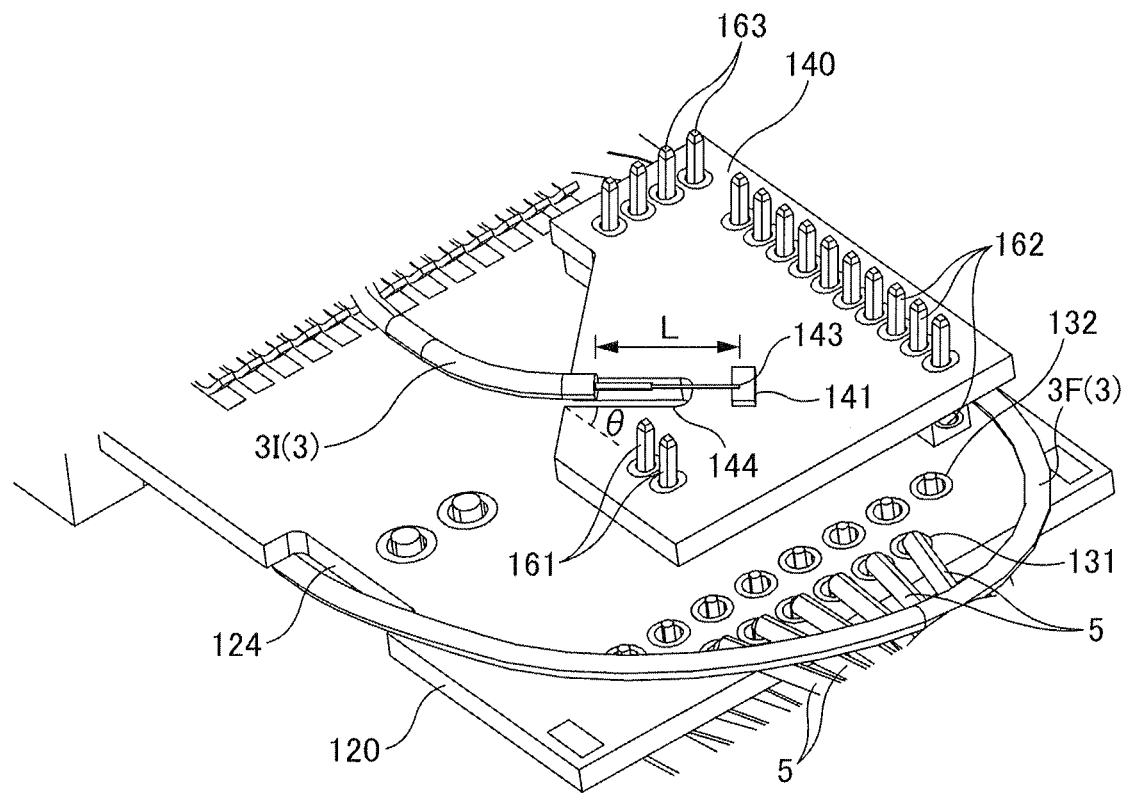
FIG. 15 is a perspective view of a child substrate 140 of the grabber-side connector 110 and its surroundings as seen obliquely from above.
Figure 15:
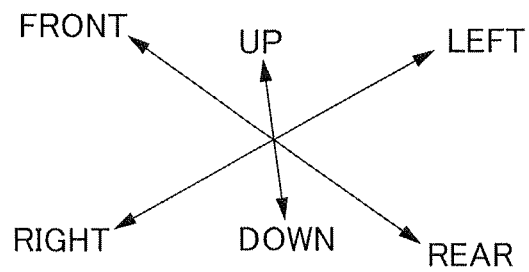

FIG. 15 is a perspective view of the child substrate 140 of the grabber-side connector 110 and its surroundings as seen obliquely from above. It should be noted that instead of the light-emitting portion 41, the light-receiving portion 141 is mounted on the child substrate 140 of the grabber-side connector 110.

There are two rows of through holes that are aligned in the left-right direction on the rear side (the composite cable 2 side) of the parent substrate 120. The through hole row on the rear side consists of six rear-side through holes 131. The through hole row on the front side consists of eight front-side through holes 132. It should be noted that the front-side through holes 132 of the grabber-side connector 110 are aligned in a single row, because the width of the parent substrate 120 of the grabber-side connector 110 in the left-right direction is greater than that of the camera-side connector 10, and the eight front-side through holes 132 can be aligned in the left-right direction.

A recess 124 is formed on the right edge of the parent substrate 120. When the parent substrate 120 is stored in a housing 111, there is almost no space between the inner surface of the housing 111 and the left and right edges of the parent substrate 120, but in the recess 124, a space is created between the parent substrate 120 and the inner surface of the housing 111. The optical fiber 3 is wired through this space, and this makes it possible to secure an extra length of the optical fiber 3 on both upper and lower sides of the parent substrate 120.

The child substrate 140 has a recessed portion 144 formed thereon. The recessed portion 144 is a cut that is formed to avoid interference of a coating of the secondary-coated optical fiber of the optical fiber 3 with the child substrate 140 when optically coupling the end face of the optical fiber 3 to the light-receiving portion 141. The width of the recessed portion 144 is set to be wider than the outer diameter, 900 μm, of the optical fiber 3 (including the coating of the secondary-coated optical fiber). Thus, the length L from the end face of the optical fiber 3 to the coating of the secondary-coated optical fiber can be reduced, and damage to the optical fiber 3 can be suppressed. Moreover, a portion of the coating of the optical fiber 3 can be positioned in the recessed portion 144, so that the child substrate 140 and the coating of the optical fiber 3 can be fixed to each other by bonding.

The recessed portion 144 is obliquely formed with respect to the front-rear direction and the left-right direction. Here, the cutting direction of the recessed portion 144 is slanted at 45° with respect to the front-rear direction. Thus, the optical fiber 3 is connected to the child substrate 140 in such a manner that it forms an acute angle with respect to the front-rear direction.

The light-receiving portion 141 is mounted on the extension of the recessed portion 144. The light-receiving portion 141 is optically coupled to the end face of the optical fiber 3, which is guided along the recessed portion 144 onto the child substrate 140. It should be noted that an optical coupling portion 143 that optically couples the light-receiving portion 141 and the optical fiber 3 has approximately the same configuration as the above-described optical coupling portion 43 shown in FIG. 8A. Moreover, at least two bonded portions of an end portion of the optical fiber 3 are the same as those described above with reference to FIG. 8B.

Wiring of Optical Fiber 3

Figure 16:
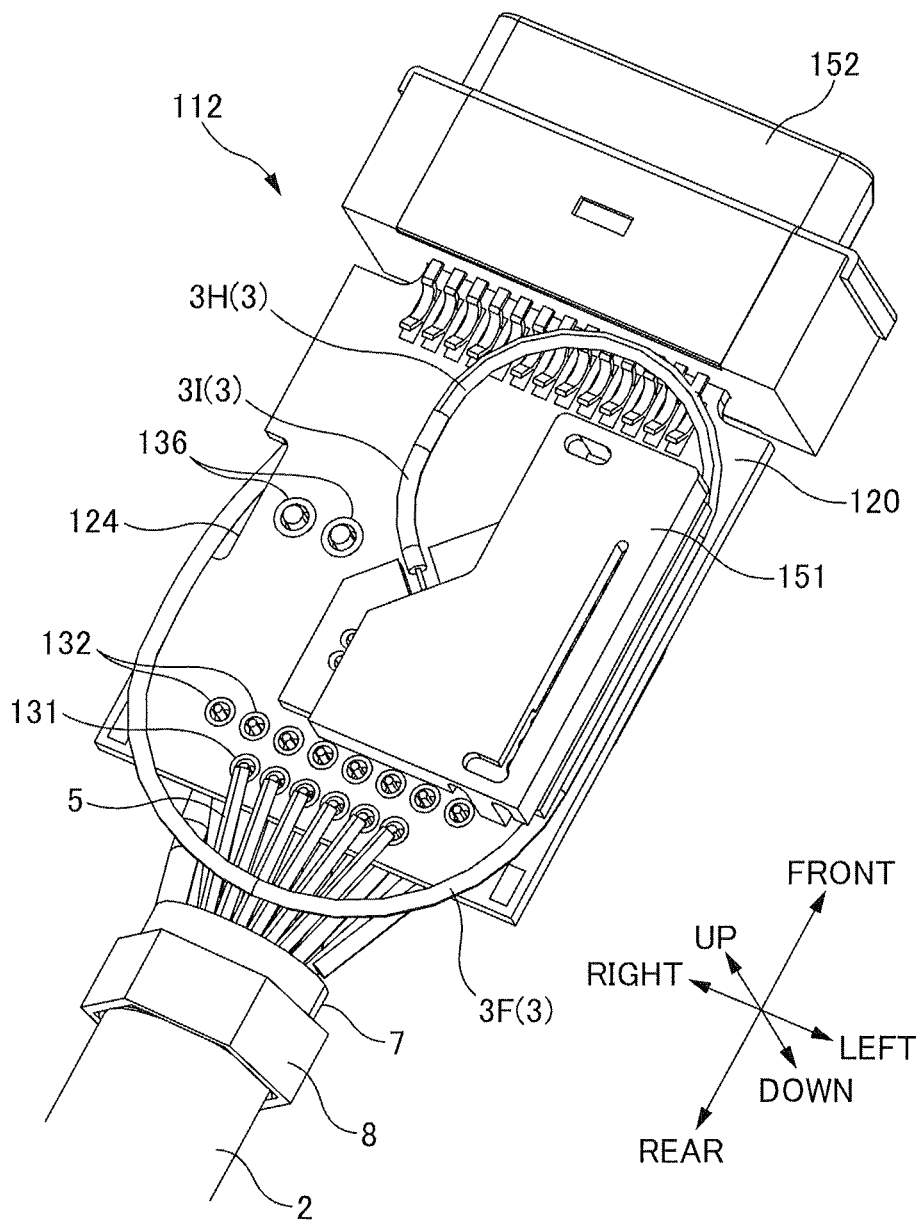
FIG. 16 is a perspective view of a termination portion 112 of the grabber-side connector 110 as seen obliquely from above.
Figure 17:
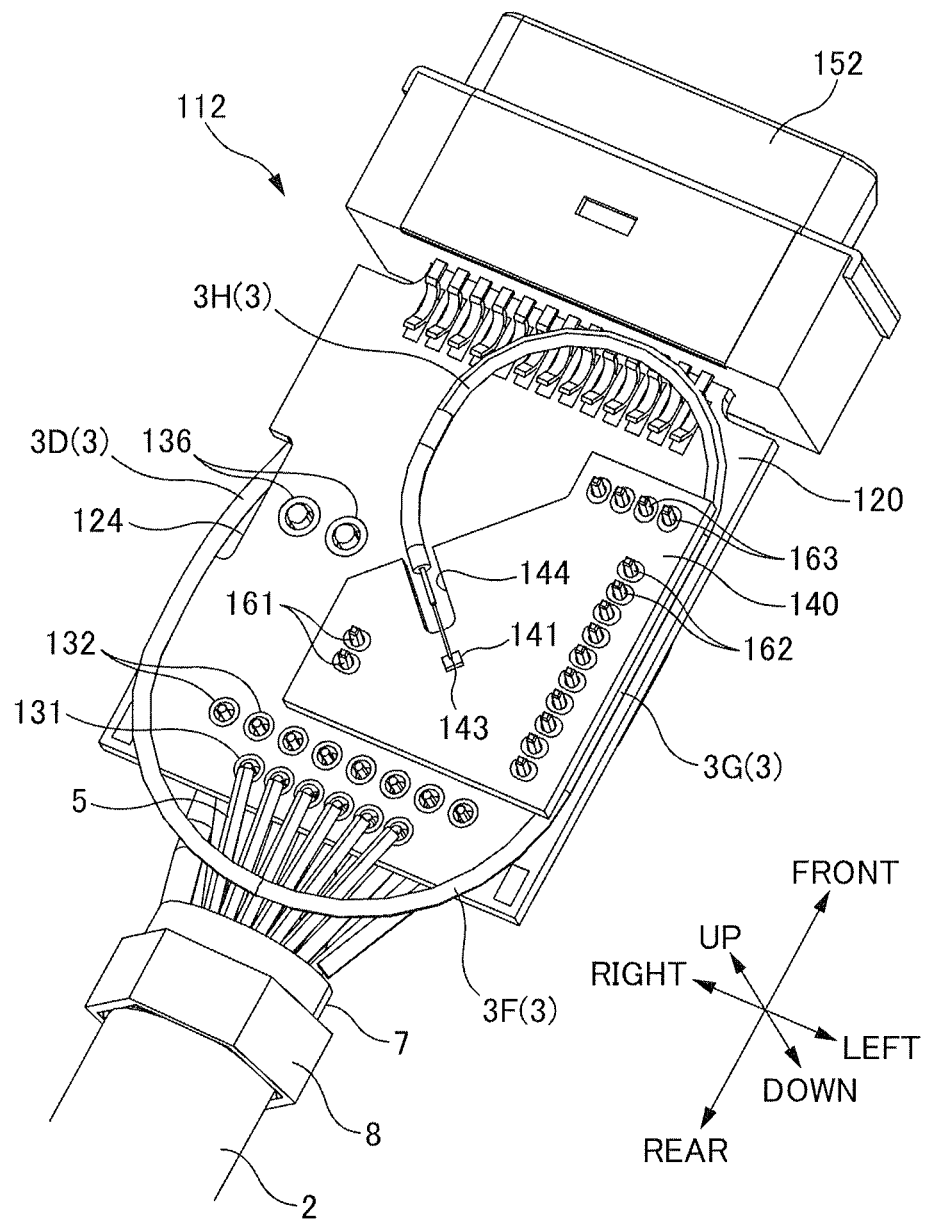
FIG. 17 shows a state in which a protective cover 151 shown in FIG. 16 has been removed.
Figure 18:
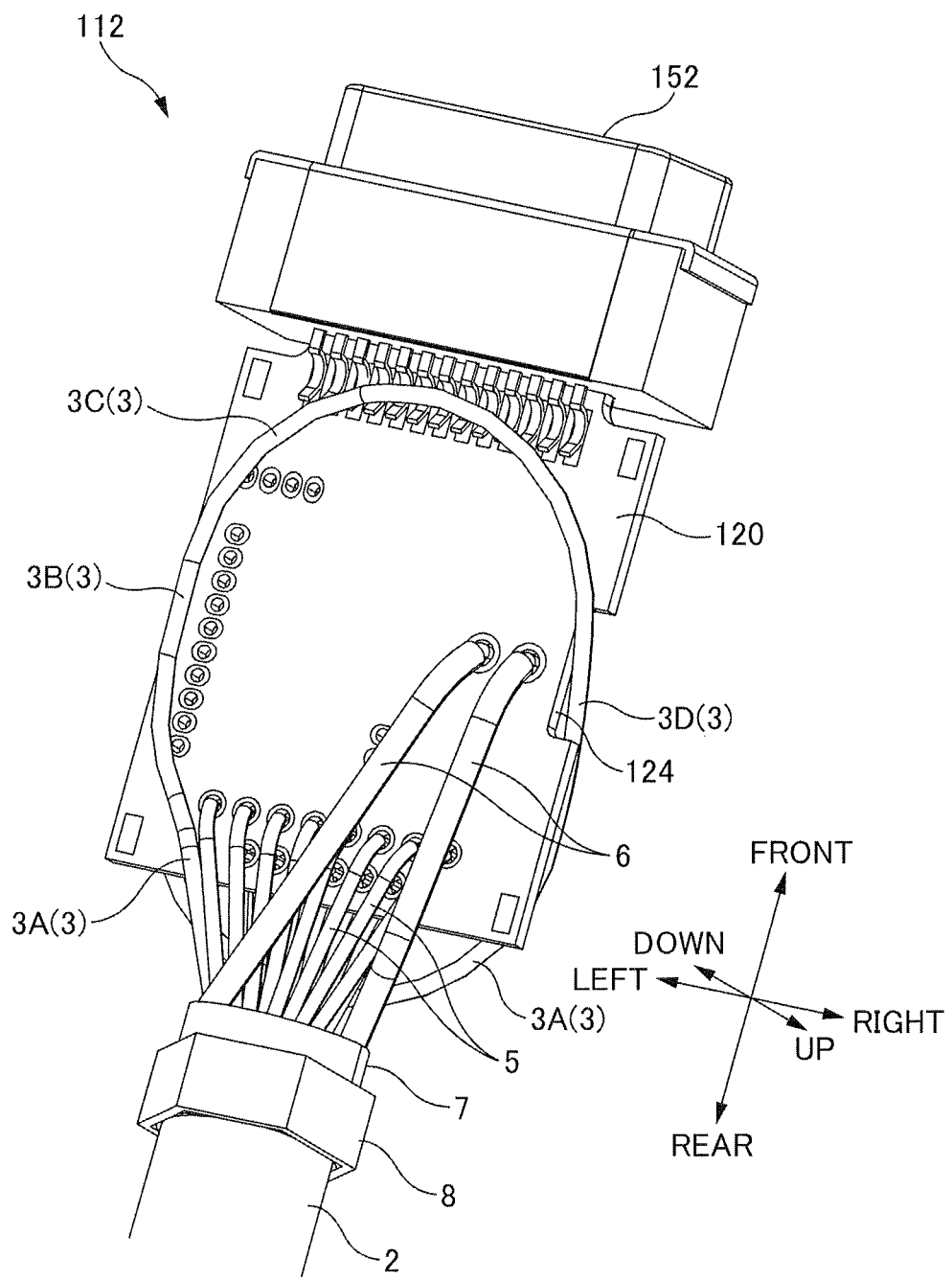
FIG. 18 is a perspective view of the termination portion 112 of the grabber-side connector 110 as seen obliquely from below.

FIG. 16 is a perspective view of a termination portion 112 of the grabber-side connector 110 as seen obliquely from above. FIG. 17 shows a state in which a protective cover 151 in FIG. 16 has been removed. FIG. 18 is a perspective view of the termination portion 112 of the grabber-side connector 110 as seen obliquely from below.

The extra length of the optical fiber 3 is managed by approximately two loops within the housing 111. Thus, the optical fiber 3 is routed within the housing 111 so that the orientation thereof in the front-rear direction is changed three times. As a result, the optical fiber 3 within the housing 111 has at least three bent portions (the first front-side bent portion 3C, the rear-side bent portion 3F, and the second front-side bent portion 3H) that are bent into a U shape. These bent portions that are bent into a U shape prevent any tension applied to the composite cable 2 from being conveyed to the optical coupling portion 143 at the end portion of the optical fiber 3, and therefore damage to the optical fiber 3 and the optical coupling portion 143 can be suppressed.

In this embodiment, one of the two bent portions on the front side (the first front-side bent portion 3C) is positioned on the lower side of the parent substrate 120, and the other bent portion (the second front-side bent portion 3H) is positioned on the upper side of the parent substrate 120. That is to say, the optical fiber 3 is wired in such a manner that the two bent portions on the front side are separated to the upper side and the lower side of the parent substrate 120. In other words, the optical fiber 3 is wired in such a manner that the two bent portions on the front side are positioned on opposite sides of the parent substrate 120. Thus, portions of the optical fiber 3 can avoid being stacked on both of the upper side and the lower side of the parent substrate 120. Moreover, since the portions of the optical fiber 3 are not stacked, it is easy to immovably hold the optical fiber 3.

In order to manage of the extra length of the optical fiber 3 on both of the upper side and the lower side of the parent substrate 120, the recess 124 is formed in the parent substrate 120. The recess 124 has a space formed between the parent substrate 120 and the inner surface of the housing 111. The transition portion 3D of the optical fiber 3 passes through this space, thereby the extra length of the optical fiber 3 are connected between the upper side and the lower side of the substrate.

The second upper-side linear portion 3G of the optical fiber 3 is wired outward (left) of a 10-pin header 162 (see FIG. 17). Thus, the second upper-side linear portion 3G is restrained in the left-right direction between the housing 111 and the 10-pin header 162. Furthermore, the second upper-side linear portion 3G is wired between the parent substrate 120 and the child substrate 140 and is therefore restrained in the up-down direction as well. Accordingly, movement of the second upper-side linear portion 3G in the left-right direction and the up-down direction is restricted.

The length of that portion of the second upper-side linear portion 3G that is restrained in the left-right direction and the up-down direction is long. Therefore, the second upper-side linear portion 3G is unlikely to move within the housing 111. Thus, damage to the optical coupling portion 143 that is caused by movement of the end of the optical fiber 3 within the housing 111 can be suppressed.

In order to suppress damage to the optical coupling portion 143 by increasing as much as possible the length of the second upper-side linear portion 3G (increasing the length of the restrained portion), which is closer to the end of the optical fiber 3, the rear-side bent portion 3F is disposed on the upper side of the parent substrate 120 (the side on which the child substrate 140 is mounted). Moreover, in order to dispose the rear-side bent portion 3F on the upper side of the parent substrate 20, the transition portion 3D (and the recess 124 of the parent substrate 120) is disposed opposite the second upper-side linear portion 3G (on the right side) in the left-right direction.

In this embodiment, the direction of the optical fiber 3 in the optical coupling portion 143 is slanted at an angle θ with respect to the front-rear direction (θ is an acute angle (within a range of 0°<θ<90°), and is 45° in this example). Thus, in this embodiment, it is sufficient to bend only once the leading end portion 3I of the optical fiber 3, which is beyond the second front-side bent portion 3H (see FIG. 13). Therefore, in this embodiment, it is possible to reduce the length of the leading end portion 3I in the front-rear direction, and it is possible to reduce the size of the grabber-side connector 110.

In order to eliminate the need to bend the leading end portion 3I of the optical fiber 3 more than once, the cutting direction of the recessed portion 144 in the child substrate 140 is slanted at an angle θ (45° in this example) with respect to the front-rear direction. Thus, the end face of the optical fiber 3 and the light-receiving portion 141 are optically coupled to each other in such a manner that the optical fiber 3 forms an acute angle with respect to the front-rear direction in the optical coupling portion 143.

By wiring the optical fiber 3 as described above, it is possible to stably store the long optical fiber 3 within the narrow housing 11 without using a cable clamp and the like or increasing the number of bonded portions.

Wiring of Signal Lines 5 and Power Supply Lines 6

Next, wiring of the signal lines 5 and the power supply lines 6 will be described using FIGS. 15 to 18.

The fourteen signal lines 5 are connected to the parent substrate 120 by through-hole connection. The reason for employing connection by through-hole connection, and not surface mounting, is to prevent the signal lines 5 from easily disconnecting from the parent substrate 120 even when a tension is applied to the cable 2.

Six signal lines 5 of the fourteen signal lines 5 are respectively connected to the six rear-side through holes 131 by through-hole connection. End portions of these six signal lines 5 are inserted downward into the rear-side through holes 131 and are soldered. The other eight signal lines 5 are respectively connected to the eight front-side through holes 132 by through-hole connection. End portions of these eight signal lines 5 are inserted upward into the front-side through holes 132 and soldered.

That is to say, soldering of the rear-side through holes 131 and soldering of the front-side through holes 132 are performed in opposite directions. Thus, the fourteen signal lines 5 can be distributed to both sides of the parent substrate 120, which facilitates the operation for connecting the signal lines 5 in a small region. Moreover, since the signal lines 5 are connected from both sides of the parent substrate 120 by through-hole connection, the signal lines 5 are less likely to disconnect from the parent substrate 120 even when a tension is applied to the signal lines 5.

Furthermore, the end portions of all of the six signal lines 5 connected to the rear-side through holes 131 are inserted downward into the rear-side through holes 131 from above. That is to say, the end portions of these six signal lines 5 are inserted from the upper side of the parent substrate 120, on which the rear-side bent portion 3F of the optical fiber 3 is present. Thus, the rear-side bent portion 3F of the optical fiber 3 does not come into contact with edges of the solder protruding from the rear-side through holes 131 and therefore can be prevented from being damaged. Moreover, the rear-side bent portion 3F is wired above the coatings of the six signal lines 5. Therefore, even if the rear-side bent portion 3F comes into contact with the signal lines 5, the coatings of the signal lines 5 serve as cushioning materials, so that damage is unlikely to occur.

The six signal lines 5 that are connected to the rear-side through holes 131 are connected by through-hole connection without being curved (see FIG. 17). In contrast, the eight signal lines 5 are connected to the front-side through holes 132 by through-hole connection while being slightly curved (see FIG. 18). The reason for this is the same as described regarding wiring of the signal lines 5 in the camera-side connector 10.

The rear-side bent portion 3F is arranged above the coatings of the six signal lines 5 that are connected to the rear-side through holes 131 by through-hole connection without being curved. Thus, the signal lines 5 and the rear-side bent portion 3F can be wired in such a manner that they do not become bulky in the up-down direction.

The two power supply lines 6 are connected by through-hole connection at positions that are closer to the terminal portion 152 than the signal lines 5 are. The purpose of this is to minimize the power supply wiring pattern on the parent substrate 120.

Manufacturing Method

Figure 19:
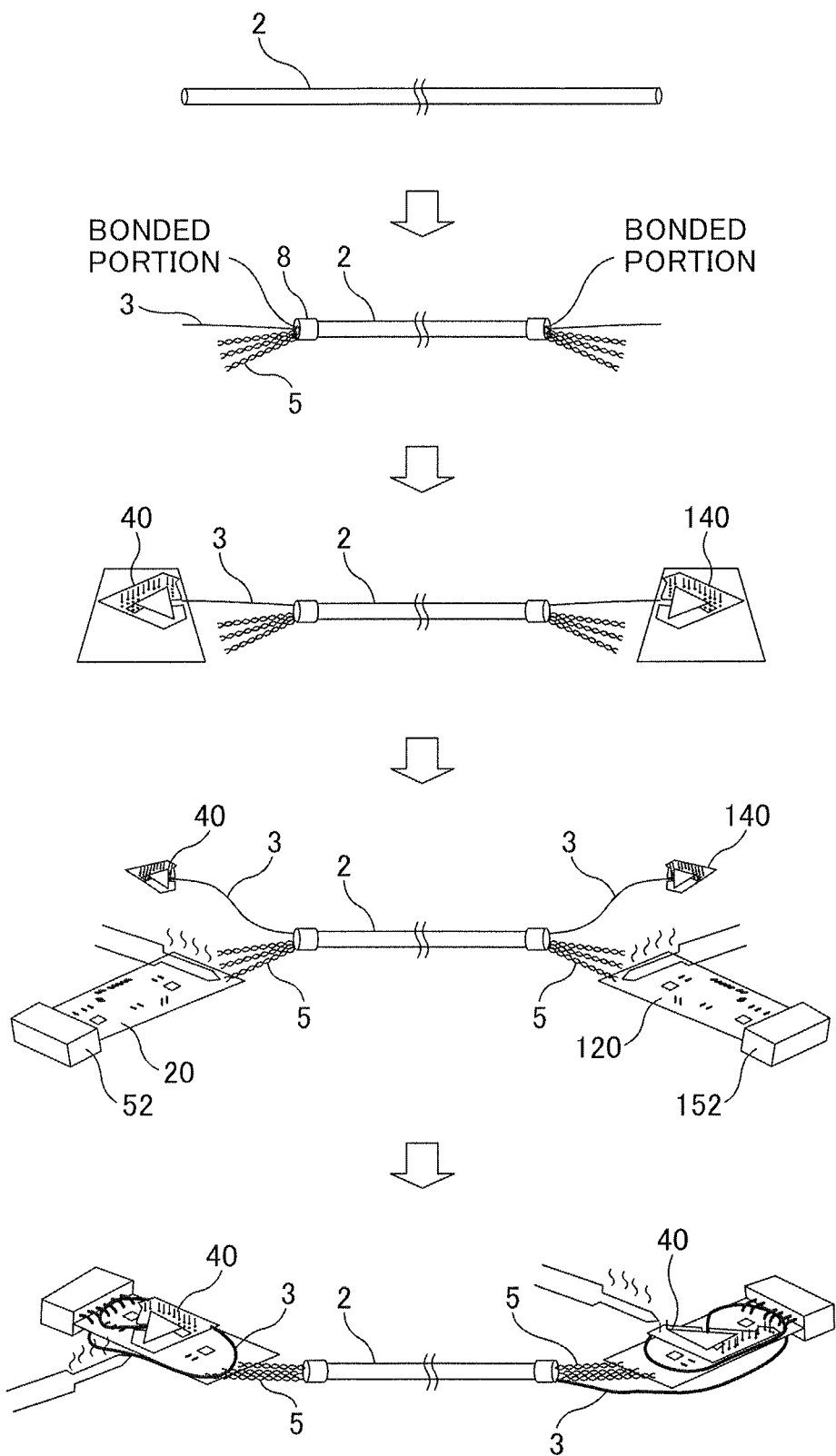
FIG. 19 is an explanatory diagram of a method for manufacturing the connectored cable 1.

FIG. 19 is an explanatory diagram of a method for manufacturing the connectored cable 1.

Preprocessing of Composite Cable 2

First, the composite cable 2 is prepared. Then, preprocessing of both ends of the composite cable 2 is performed.

In the preprocessing, a sheath on each end portion of the composite cable 2 is stripped off, and thereby the optical fiber 3, the signal lines 5, and the power supply lines 6 are exposed. In this embodiment, the optical fiber 3 is exposed from the composite cable 2 so that the exposed portion of the optical fiber 3 has a length sufficient to manage the extra length of two loops within a connector.

At each stripping portion 7 of the composite cable 2, an adhesive is applied to a circumference of the optical fiber 3, and the optical fiber 3, the signal lines 5, and the power supply lines 6 are bonded to one another (in the diagram, the bonded portions are indicated in black). Due to this bonding, even when a tension is applied to the composite cable 2, it is possible to prevent the tension from being transferred beyond the stripping portion 7 of the composite cable 2.

A metal ring is inserted into the stripping portion 7 of the composite cable 2, and this metal ring is crimped, composing the caulking member 8. Due to this caulking member 8, even when a tension is applied to the composite cable 2, it is possible to prevent the tension from being transferred beyond the stripping portion 7 of the composite cable 2.

Connection of Optical Fiber 3

Next, an end portion of the optical fiber 3 is attached to child substrate 40 (and to the child substrate 140). At this time, first, a UV coating at the end portion of the optical fiber 3 is removed, and thereby the primary-coated optical fiber is exposed. An end portion of the primary-coated optical fiber is cut, and a termination of the optical fiber 3 is performed. The length from the end face of the optical fiber 3 to the coating of the secondary-coated optical fiber is L (see FIGS. 7, 8B, and 15). Then, the terminated optical fiber 3 and the child substrate 40 are placed in an automatic alignment apparatus, the photoelectric conversion portion (the light-emitting portion 41, the light-receiving portion 141) installed on the child substrate 40 and the end face of the optical fiber 3 are automatically aligned, and afterward the optical coupling portion 43 is formed (see FIG. 8A). After attaching the optical fiber 3 to the child substrate 40, the protective cover 51 is attached to the child substrate 40 in order to protect the optical coupling portion 43. Moreover, since the optical coupling portion 43 is likely to be damaged, the coating of the optical fiber 3 that is located in the recessed portion 44 of the child substrate 40 and the child substrate 40 are fixed to each other by bonding (see FIG. 8B).

In this embodiment, the child substrate 40 is separated from the parent substrate 20, and this makes it possible to reduce the size of the substrate to be placed in the automatic alignment apparatus. Moreover, the child substrate 40 can have a shape that is independent of the shape and the size of the connector, so that the alignment process can be easily automated.

In this embodiment, the optical fiber 3 is exposed from the composite cable 2 so that the extra length of the optical fiber 3 is managed by two loops within the connector. However, there is a possibility that a failure may occur at the time of connecting the optical fiber 3 (for example, at the time of the termination work of the optical fiber 3). In such a case, the optical fiber 3 can be cut and shortened so that the extra length is reduced by an amount corresponding to one loop. In this case, as shown in a reference diagram of FIG. 26, the extra length can be managed by one bent portion; where normally there are three bent portions (the first front-side bent portion 3C, the rear-side bent portion 3F, and the second front-side bent portion 3H). Thus, even if connection of the optical fiber 3 is failed once, it is not necessary to discard the composite cable 2.

Connection of Signal Lines 5 and Power Supply Lines 6

Next, the signal lines 5 and the power supply lines 6 are soldered to the parent substrate 20 (and to the parent substrate 120). The terminal portion 52 is connected to the parent substrate 20 in advance.

First, the six signal lines 5 are respectively connected to the six rear-side through holes 31 by through-hole connection. The end portions of these six signal lines 5 are inserted downward into the rear-side through holes 31 and are soldered. The other eight signal lines 5 are respectively connected to the eight front-side through holes 32 by through-hole connection. The end portions of these eight signal lines 5 are inserted upward into the front-side through holes 32 and are soldered. Moreover, the two power supply lines 6 are also connected to the parent substrate 20 by through-hole connection.

In this embodiment, the parent substrate 20 and the child substrate 40 are separated from each other. This makes it possible to prevent a soldering iron from damaging the optical fiber at the time of soldering of the signal lines 5 and the power supply lines 6. Also, it is possible to avoid contamination of the optical coupling portion 43 by flying flux or the like.

Moreover, in this embodiment, soldering of the rear-side through holes 31 and soldering of the front-side through holes 32 are performed in opposite directions. This facilitates the soldering operation of the signal lines 5, and also the signal lines 5 becomes less likely to disconnect from the parent substrate 20.

Moreover, since the eight signal lines 5 that are connected to the front-side through holes 32 are connected while being slightly curved, soldering of the rear-side through holes 31 can be visually inspected by shifting the eight signal lines 5 connected to the front-side through holes 32 in the left-right direction.

Connection Between Parent Substrate and Child Substrate (Wiring of Optical Fiber 3)

Next, the parent substrate 20 and the child substrate 40 are connected to each other (the parent substrate 120 and the child substrate 140 are also connected to each other). At this time, wiring of the optical fiber 3 is also performed.

First, as shown in FIG. 11 (or FIG. 18), on the lower side of the parent substrate 20, an operator places outward (left) of the 10-pin header 62 the optical fiber 3 which is near the stripping portion 7 of the composite cable 2. Thus, the base portion 3A is formed. Then, the operator wires the optical fiber 3 in the front-rear direction along the 10-pin header 62 and outward of the 10-pin header 62. Thus, the lower-side linear portion 3B is formed. Then, the operator changes the orientation of the optical fiber 3 in the front-rear direction and wires a U-shaped bent portion on the front lower side of the parent substrate 20. Thus, the first front-side bent portion 3C is formed. Subsequently, the operator wires the optical fiber 3 from the lower side to the upper side in the recess 24 of the parent substrate 20, thereby forming the transition portion 3D.

Then, as shown in FIG. 9 (or FIG. 16), on the upper side of the parent substrate 20, the operator places the optical fiber 3 in the front-rear direction outward (right) of the 2-pin header 61. Thus, the first upper-side linear portion 3E is formed. Then, the operator changes the orientation of the optical fiber 3 in the front-rear direction and wires a U-shaped bent portion on the rear upper side of the parent substrate 20. Thus, the rear-side bent portion 3F is formed. The rear-side bent portion 3F is arranged above the coatings of the six signal lines 5 connected to the rear-side through holes 31. Then, the operator wires the optical fiber 3 in the front-rear direction along the 10-pin header 62 and outward of the 10-pin header 62. Thus, the second upper-side linear portion 3G is formed. Then, the operator changes the orientation of the optical fiber 3 in the front-rear direction and wires a U-shaped bent portion on the front upper side of the parent substrate 20. Thus, the second front-side bent portion 3H is formed. Then, the operator bends a portion of the optical fiber 3 beyond the second front-side bent portion 3H once. Thus, the leading end portion 3I is formed. The operator also installs the child substrate 40 on the parent substrate 20 with the 2-pin header 61, the 10-pin header 62, and the 4-pin header 63. At the time of the installation of the child substrate 40 on the parent substrate 20, the second upper-side linear portion 3G is sandwiched between the parent substrate 20 and the child substrate 40. Moreover, in the case of the camera-side connector 10, the first upper-side linear portion 3E also is sandwiched between the parent substrate 20 and the child substrate 40. Due to sandwiching the optical fiber 3 between the parent substrate 20 and the child substrate 40, it is possible to restrain the optical fiber 3 from moving in the up-down direction.

In this embodiment, the parent substrate 20 and the child substrate 40 are separated from each other, and therefore it is easy to wire the optical fiber in the above-described manner.

It should be noted that in the case of the camera-side connector 10, both of the first upper-side linear portion 3E and the second upper-side linear portion 3G are wired so as to be sandwiched between the parent substrate 20 and the child substrate 40. Therefore, at the time of the installation of the child substrate 40 on the parent substrate 20, the rear-side bent portion 3F is likely to be subject to a downward force. However, since the rear-side bent portion 3F is arranged above the coatings of the signal lines 5, the coatings of the signal lines 5 serve as cushioning materials, so that damage to the optical fiber 3 is suppressed.

After installing the child substrate 40 on the parent substrate 20, the operator electrically connects the parent substrate 20 and the child substrate 40 by soldering of the pins of the 2-pin header 61, the 10-pin header 62, and the 4-pin header 63. Thus, the termination portion 12 is completed. At this time, the protective cover 51 attached to the child substrate 40 prevents the soldering iron from damaging to the optical fiber. Also, it is possible to avoid contamination of the optical coupling portion 43 by flying flux and the like.

After the termination portion 12 has been completed, the case 11A accommodates the termination portion 12. Then, the operator covers the accommodating portion of the case 11A with the cover 11B, and fastens the case 11A and the cover 11B to each other by screws. Thus, the connectored cable 1 is completed.

MODIFIED EXAMPLES

First Modified Example

Example in Which Number of Loops of Optical Fiber 3 is Changed

In the foregoing embodiment, the extra length of the optical fiber 3 is managed by approximately two loops within the connector, and there were three bent portions within the connector. However, a method for managing the extra length of the optical fiber 3 within the connector is not limited to this. The extra length of the optical fiber 3 may also be managed by three or more loops within the connector.

Figure 20:
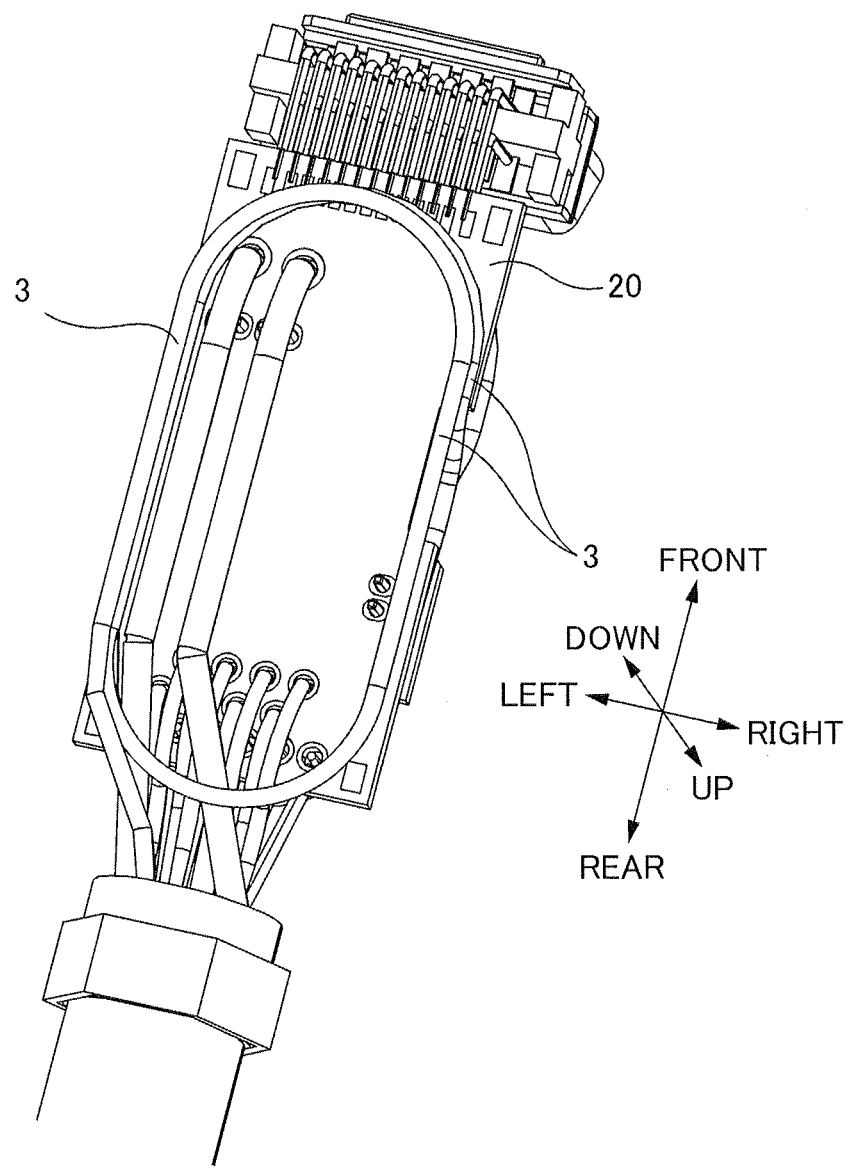
FIG. 20 is a perspective view of the termination portion 12 of the camera-side connector 10 according to a first modified example as seen obliquely from below.

FIG. 20 is a perspective view of the termination portion 12 of the camera-side connector 10 according to the first modified example as seen obliquely from below. It should be noted that the configuration and wiring on the upper side of the parent substrate 20 are the same as those of the above-described embodiment and therefore are omitted from the drawing.

In the first modified example, the extra length of the optical fiber 3 is managed by approximately three loops within the housing 11. Thus, the optical fiber 3 is routed within the housing 11 so that the orientation thereof in the front-rear direction is changed five times. As a result, the optical fiber 3 within the housing 11 has five bent portions that are bent into a U shape. Among the five bent portions, three bent portions are located on the front side, and two bent portions are located on the rear side. Among the three bent portions that are located on the front side, one bent portion is located on the upper side of the parent substrate 20 (not shown in FIG. 20), and two bent portions are located on the lower side of the parent substrate 20. Moreover, one of the two bent portions on the rear side is located on the upper side of the parent substrate 20 (not shown in FIG. 20), and the other is located on the lower side of the parent substrate 20.

In the first modified example, the optical fiber 3 are wired so that the three bent portions on the front side are separated to the upper side and the lower side of the parent substrate 20. Thus, in the first modified example, when compared with a case where the three bent portions are disposed on only either side of the parent substrate 20, the optical fiber 3 can avoid becoming bulky in the up-down direction, and the optical fiber 3 is less likely to move within the housing 11.

Moreover, in the first modified example, if the direction of the optical fiber 3 in the optical coupling portion 43 is slanted at an acute angle θ (for example, 45°) with respect to the front-rear direction, it is also sufficient to bend only once the leading end portion 3I (not shown in FIG. 20) of the optical fiber 3, which is beyond the second front-side bent portion 3H (not shown in FIG. 20). Therefore, it is possible to reduce the length of the leading end portion 3I in the front-rear direction, and it is possible to reduce the connector size (see FIG. 13).

Moreover, in the first modified example, if the rear-side bent portion 3F (not shown in FIG. 20) of the optical fiber 3 on the upper side of the parent substrate 20 is wired above the coatings of the six signal lines 5 connected to the rear-side through holes 31, the optical fiber 3 also becomes less likely to be damaged.

In the case where the extra length of the optical fiber 3 is managed by three or more loops within the housing 11 as in the first modified example, it is desirable that only one bent portion is arranged on the front upper side of the parent substrate 20. In this manner, portions of the optical fiber 3 can avoid being stacked on the upper side of the parent substrate 20 on which the optical coupling portion 43 is present. Also, the optical fiber 3 becomes less likely to move within the housing 11, and damage to the optical coupling portion 43 can be suppressed. In this case, since the bent portions are stacked on the lower side of the parent substrate 20, the optical fiber 3 becomes relatively likely to move, but this does not have a significant influence on the optical coupling portion 43 and can be permitted.

Second Modified Example

Example in Which Parent Substrate and Child Substrate are Not Separated

In the above-described embodiment, the parent substrate and the child substrate are separated from each other, which facilitates the connecting operation and the wiring operation of the optical fiber 3, the signal lines 5, and the power supply lines 6. However, if it is allowable to take time and effort for the connecting operation and the wiring operation, it is not necessary to separate the parent substrate and the child substrate from each other. In the case where the parent substrate and the child substrate are not separated from each other, the photoelectric conversion portion (the light-emitting portion 41 or the light-receiving portion 141) is installed on the parent substrate 20 by directly mounting it on the parent substrate 20.

Figure 21:
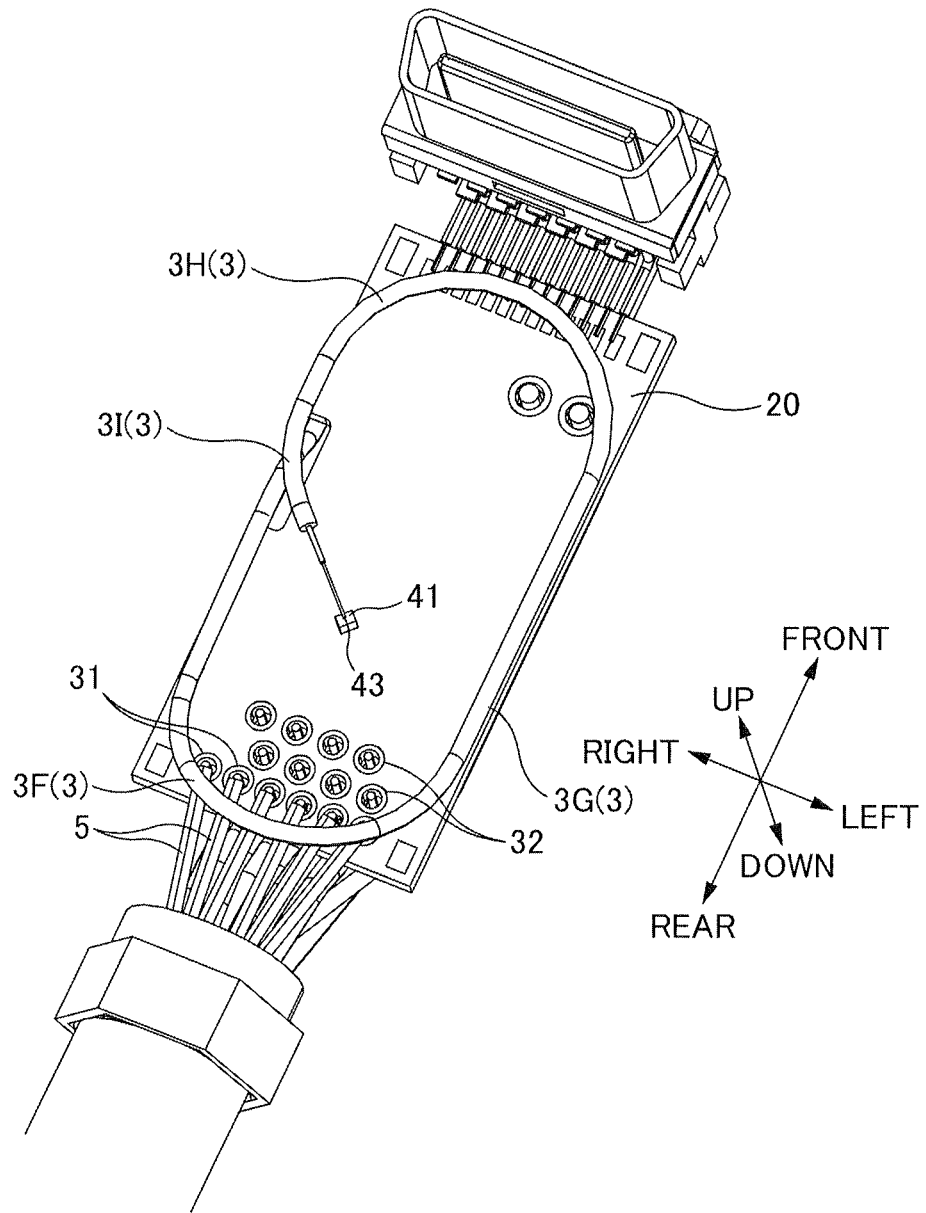
FIG. 21 is a perspective view of the termination portion 12 of the camera-side connector 10 according to a second modified example as seen obliquely from above.

FIG. 21 is a perspective view of the termination portion 12 of the camera-side connector 10 according to the second modified example as seen obliquely from above. As shown in this drawing, in the second modified example, the light-emitting portion 41 serving as a photoelectric conversion portion is mounted on the upper side of the parent substrate 20, and the optical coupling portion 43 is located on the upper side of the parent substrate 20.

In this second modified example, the optical fiber 3 is also wired so that the two bent portions on the front side are separated to the upper side and the lower side of the parent substrate 20. Thus, in the second modified example, portions of the optical fiber 3 can also avoid being stacked on both of the upper side and the lower side of the parent substrate 20.

Moreover, in the second modified example, the direction of the optical fiber 3 in the optical coupling portion 43 is also slanted at an acute angle θ (45° in this example) with respect to the front-rear direction. Thus, in the second modified example, it is also sufficient to bend only once the leading end portion 3I of the optical fiber 3, which is beyond the second front-side bent portion 3H. Therefore, it is possible to reduce the length of the leading end portion 3I in the front-rear direction, and it is possible to reduce the connector size.

Moreover, in the second modified example, the rear-side bent portion 3F of the optical fiber 3 is also wired above the coatings of the six signal lines 5 connected to the rear-side through holes 31. Thus, the optical fiber 3 is also less likely to be damaged.

In order to realize the second modified example, it is necessary to place a light-emitting face of the VCSEL, which is the light-emitting portion 41, upward by 450 μm or more with respect to the surface of the parent substrate 20. For this purpose, a submount (for example, a metallized aluminum nitride substrate) may be placed between the parent substrate 20 and the light-emitting portion 41.

Third Modified Example

Example in Which Parent Substrate Does Not Have Recess

In the above-described embodiment, the parent substrate has the recess formed thereon, and the optical fiber 3 is wired from the lower side to the upper side of the parent substrate through the recess. However, the parent substrate may not have the recess.

Figure 22:
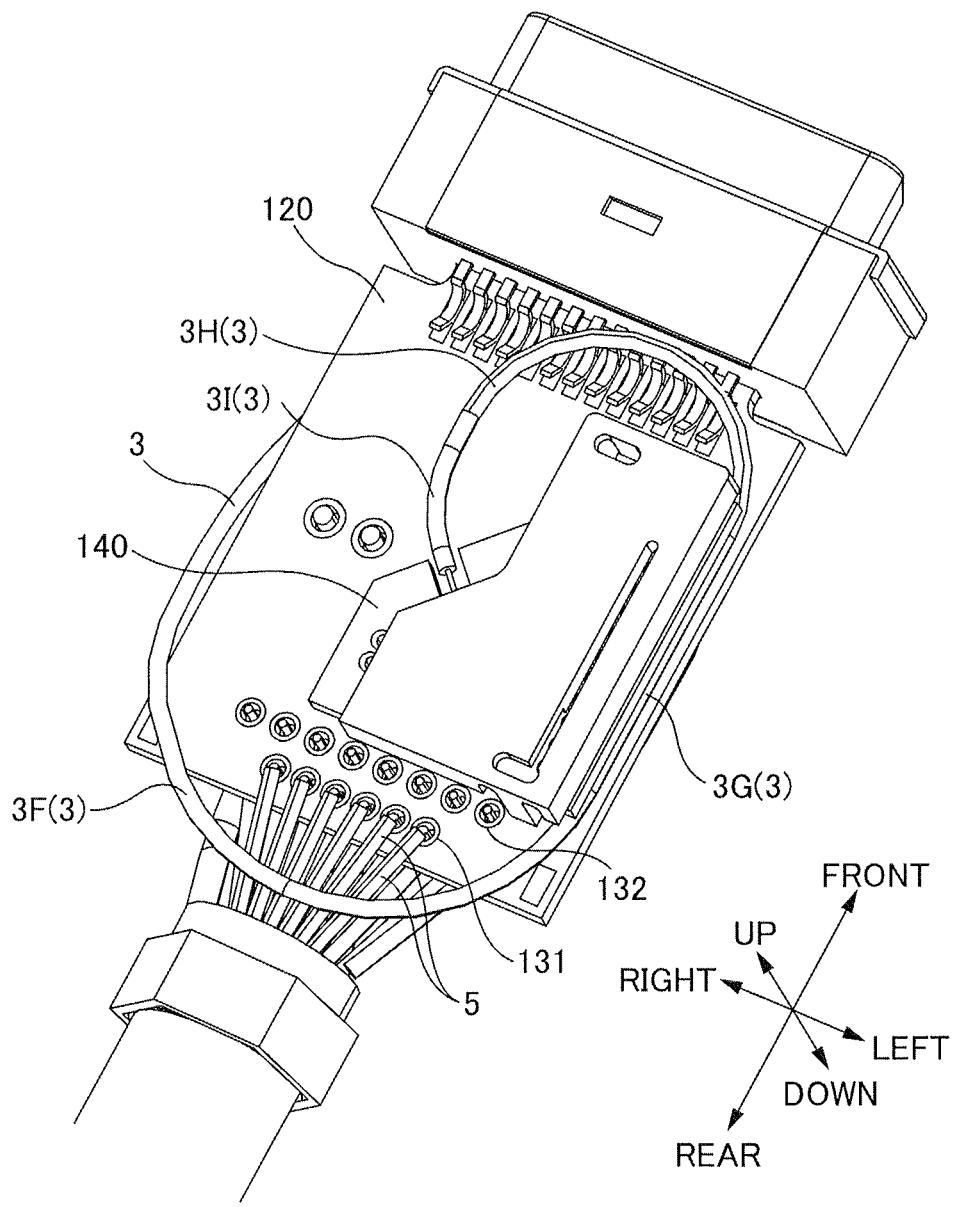
FIG. 22 shows the termination portion 112 of the grabber-side connector 110 according to a third modified example as seen obliquely from above.

FIG. 22 shows the termination portion 112 of the grabber-side connector 110 according to the third modified example as seen obliquely from above. As shown in this drawing, in the third modified example, the recess 124 is not formed on the right edge of the parent substrate 120. Moreover, in the third modified example, the optical fiber 3 is wired from the lower side to the upper side, passing the outer side of the right edge of the parent substrate 120.

In the third modified example, it is necessary to provide a space that is approximately equal to the diameter of the optical fiber between the inner surface of the housing 111 and the right edge of the parent substrate 120. For this reason, in the third modified example, the size of the housing 111 is larger than the above-described embodiment.

In this third modified example, the optical fiber 3 is also wired so that the two bent portions on the front side are separated to the upper side and the lower side of the parent substrate 120. Thus, in the third modified example, portions of the optical fiber 3 can also avoid being stacked on both of the upper side and the lower side of the parent substrate 120.

Moreover, in this third modified example, the direction of the optical fiber 3 in the optical coupling portion 143 is also slanted at an acute angle θ (45° in this example) with respect to the front-rear direction. Thus, in the third modified example, it is also sufficient to bend only once the leading end portion 3I of the optical fiber 3, which is beyond the second front-side bent portion 3H. Therefore, it is possible to reduce the length of the leading end portion 3I in the front-rear direction, and it is possible to reduce the connector size.

Moreover, in the third modified example, the rear-side bent portion 3F of the optical fiber 3 is also wired above the coatings of the six signal lines 5 connected to the rear-side through holes 131. Thus, the optical fiber 3 is also less likely to be damaged.

Fourth Modified Example

Example in Which Child Substrate Does Not Have Recessed Portion

In the above-described embodiment, the child substrate has the recessed portion formed thereon. However, the child substrate may not have the recessed portion.

Figure 23:
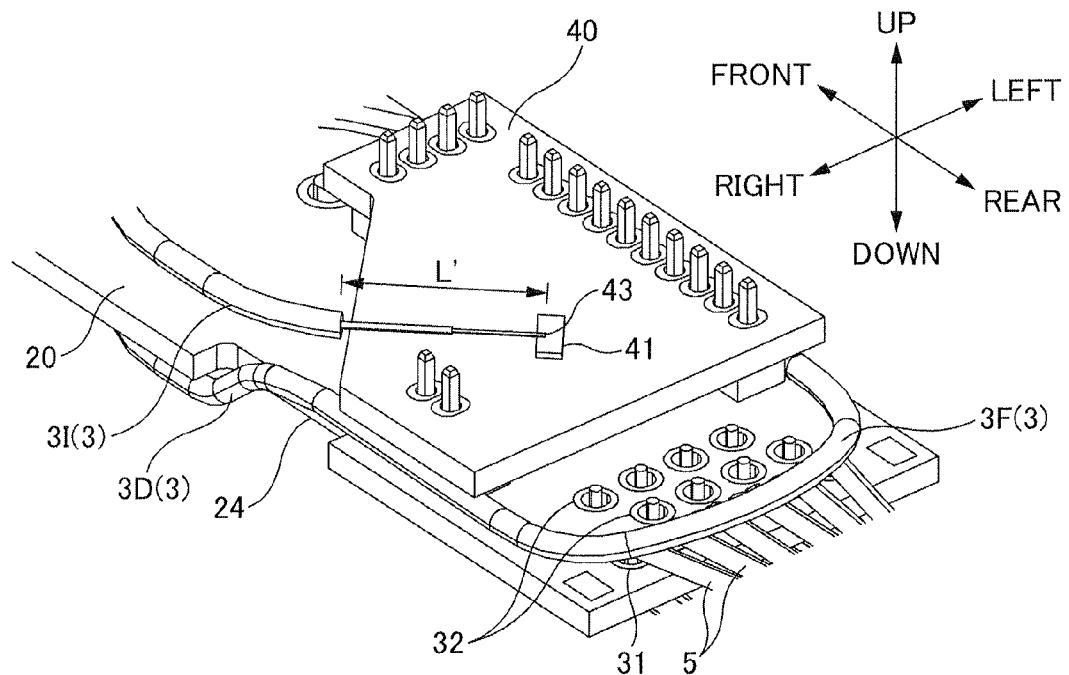
FIG. 23 is a perspective view of the child substrate 40 of the camera-side connector 10 and its surroundings according to a fourth modified example as seen obliquely from above.

FIG. 23 is a perspective view of the child substrate 40 of the camera-side connector 10 and its surroundings according to a fourth modified example as seen obliquely from above. As shown in this drawing, in the fourth modified example, the recessed portion 44 is not formed in the child substrate 40.

In the fourth modified example, if the distance between the optical axis of the optical fiber 3 and the surface of the child substrate 40 is shorter than the radius of the optical fiber 3

(including the coating of the secondary-coated optical fiber), it is not possible to reduce the length L' from the end face of the optical fiber 3 to the coating of the secondary-coated optical fiber. Therefore the optical fiber 3 is more likely to be damaged than in the above-described embodiment. Moreover, in the fourth modified example, it is more difficult to bond the coating of the optical fiber 3 and the child substrate 40 than in the above-described embodiment.

In this fourth modified example, the optical fiber 3 is also wired so that the two bent portions on the front side are separated to the upper side and the lower side of the parent substrate 20. Thus, in the fourth modified example, portions of the optical fiber 3 can also avoid being stacked on both of the upper side and the lower side of the parent substrate 20.

Moreover, in this fourth modified example, the direction of the optical fiber 3 in the optical coupling portion 43 is also slanted at an acute angle θ (45° in this example) with respect to the front-rear direction. Thus, in the fourth modified example, it is also sufficient to bend only once the leading end portion 3I of the optical fiber 3, which is beyond the second front-side bent portion 3H. Therefore, it is possible to the length of the leading end portion 3I in the front-rear direction, and it is possible to the connector size.

Moreover, in the fourth modified example, the rear-side bent portion 3F of the optical fiber 3 is also wired above the coatings of the six signal lines 5 connected to the rear-side through holes 31. Thus, the optical fiber 3 is also less likely to be damaged.

Fifth Modified Example

Example in Which Direction of Optical Fiber in Optical Coupling Portion is Not Slanted In the above-described embodiment, the direction of the optical fiber 3 in the optical coupling portion was slanted at 45° with respect to the front-rear direction. However, the direction of the optical fiber 3 in the optical coupling portion may also be parallel to the front-rear direction.

In the case where the direction of the optical fiber 3 in the optical coupling portion is parallel to the front-rear direction, it is necessary to bend the optical fiber 3 twice as described in the comparative example using FIG. 13. This results in increase of the length of the leading end portion 3I of the optical fiber 3 in the front-rear direction.

Even in this case, if the optical fiber 3 is wired so that the two bent portions on the front side are separated to the upper side and the lower side of the parent substrate 20, portions of the optical fiber 3 can avoid being stacked.

Moreover, even in this case, if the rear-side bent portion 3F of the optical fiber 3 is wired above the coatings of the six signal lines 5 connected to the rear-side through holes 31, the optical fiber 3 becomes less likely to be damaged.

Sixth and Seventh Modified Examples

Examples in Which Rear-Side Bent Portion is Not Located Above Coatings of Signal Lines In the above-described embodiment, the rear-side bent portion 3F of the optical fiber 3 is wired above the coatings of the six signal lines 5 connected to the rear-side through holes. However, the rear-side bent portion 3F of the optical fiber 3 may not be located above the coatings of the signal lines 5.

Figure 24:
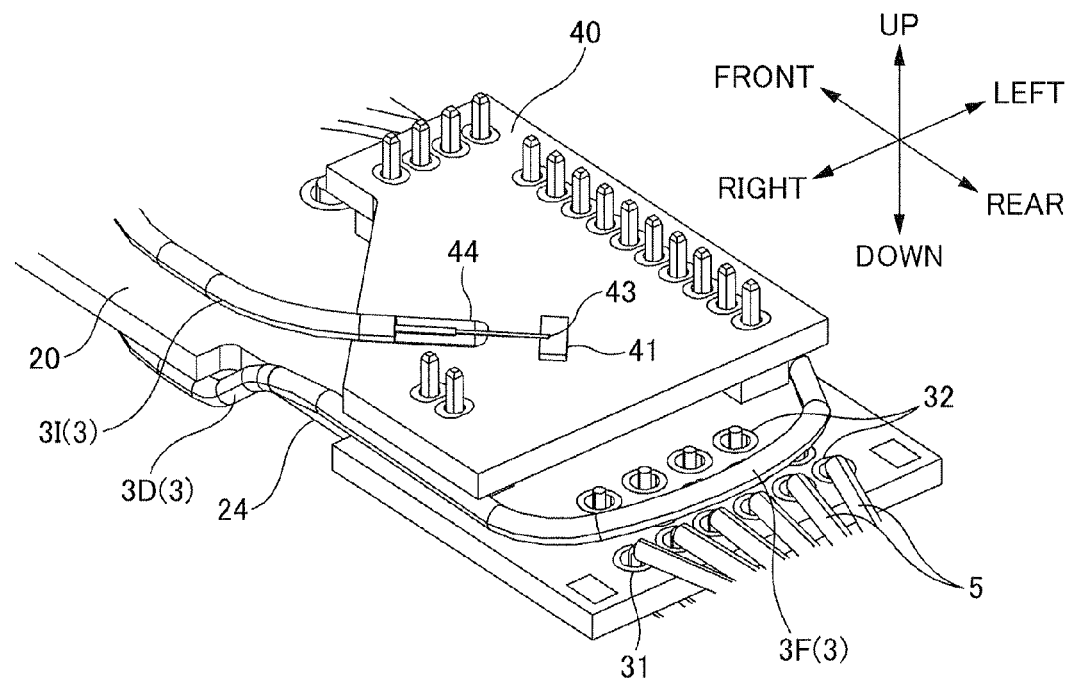
FIG. 24 is a perspective view of the child substrate 40 of the camera-side connector 10 and its surroundings according to a sixth modified example as seen obliquely.

FIG. 24 is a perspective view of the child substrate 40 of the camera-side connector 10 and its surroundings according to a sixth modified example as seen obliquely from above.

In the sixth modified example, the rear-side bent portion 3F is arranged above the front-side through holes 32. Since the end portions of the signal lines 5 are inserted upward into the front-side through holes 32, there is a possibility that edges of the solder may protrude from the front-side through holes 32. However, if this arrangement of the rear-side bent portion 3F is permitted, it also is possible in the sixth modified example to wire the optical fiber 3 so that the two bent portions on the front side are separated to the upper side and the lower side of the parent substrate 20. Moreover, if this arrangement of the rear-side bent portion 3F is permitted, it is also possible in the sixth modified example to set the direction of the optical fiber 3 in the optical coupling portion 43 so as to be slanted at an acute angle with respect to the front-rear direction.

Figure 25:
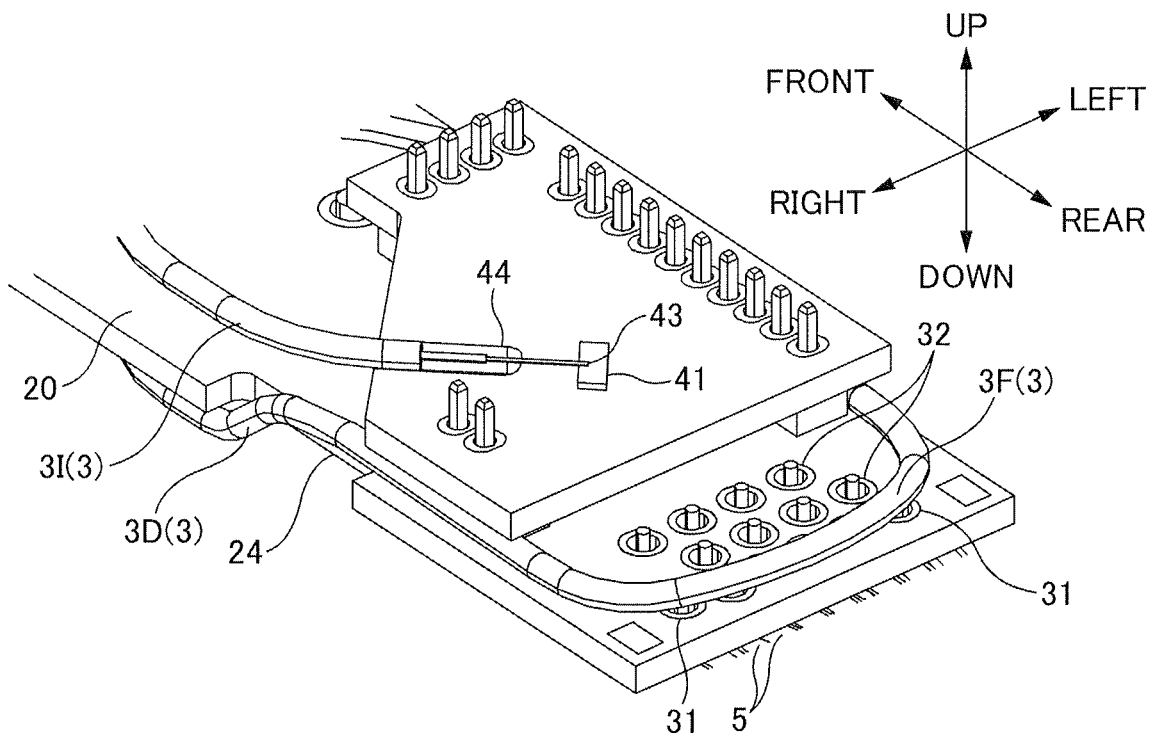
FIG. 25 is a perspective view of the child substrate 40 of the camera-side connector 10 and its surroundings according to a seventh modified example as seen obliquely.

FIG. 25 is a perspective view of the child substrate 40 of the camera-side connector 10 and its surroundings according to a seventh modified example as seen obliquely.

In the seventh modified example, soldering of the rear-side through holes 31 and soldering of the front-side through holes 32 are both performed in the same direction. Thus, the fourteen signal lines 5 cannot be distributed to two sides of the parent substrate 20. Moreover, in the seventh modified example, the end portions of the signal lines 5 that are connected to the rear-side through holes 31 are inserted upward into these through holes. Therefore, there is a possibility that edges of the solder may protrude from the rear-side through holes 31. However, if this arrangement is permitted, it is also possible in the seventh modified example to wire the optical fiber 3 so that the two bent portions on the front side are separated to the upper side and the lower side of the parent substrate 20. Moreover, if this arrangement is permitted, it is also possible in the seventh modified example to set the direction of the optical fiber 3 in the optical coupling portion 43 so as to be slanted at an acute angle with respect to the front-rear direction.

Reference Example

Example in Which Bent Portions are Not Separated to Two Sides

In the above-described embodiment, the optical fiber was wired so that the two bent portions on the front side are separated to the upper side and the lower side of the parent substrate.

Figure 26:
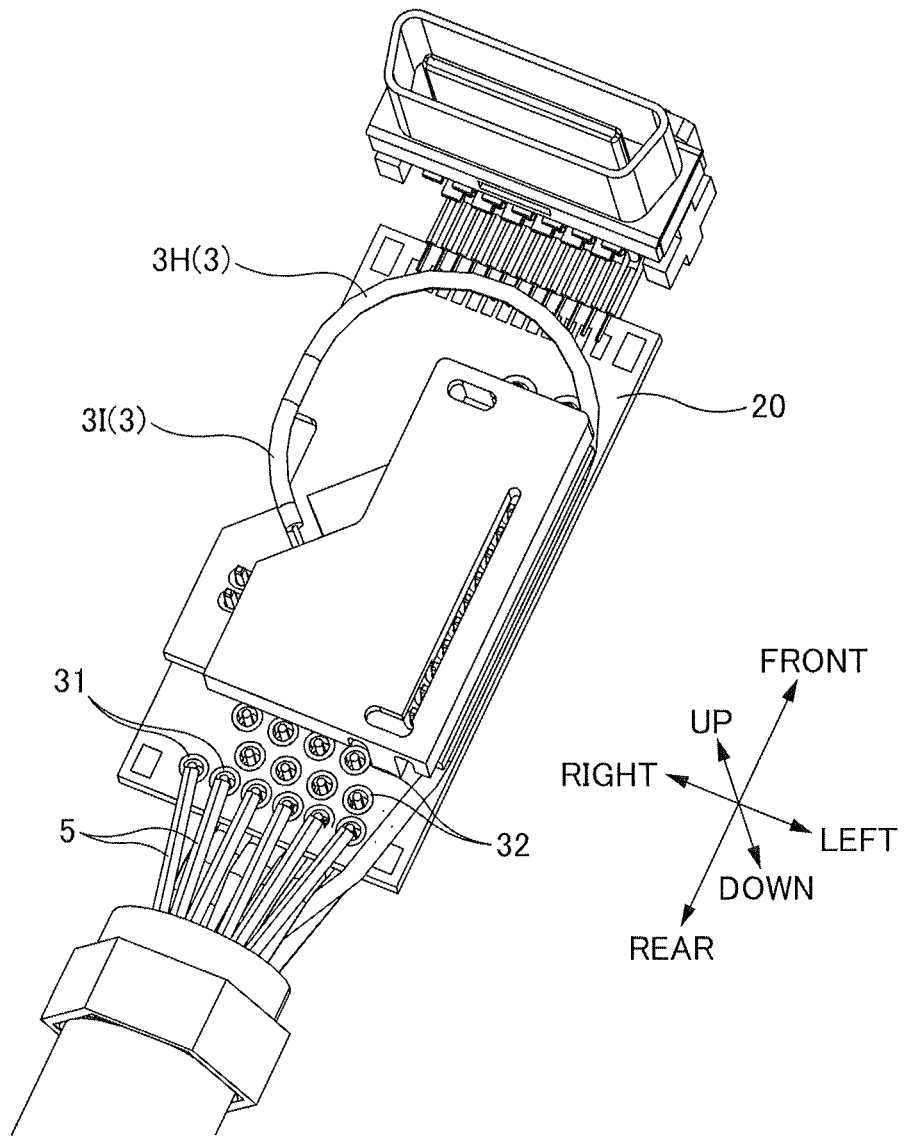
FIG. 26 is a reference diagram illustrating a case of extra length management with a single bent portion.

FIG. 26 is a perspective view of the termination portion 12 of the camera-side connector 10 of a reference example as seen obliquely from above.

In the reference example, the extra length of the optical fiber 3 is managed by approximately one loop within the housing 11. Thus, the optical fiber 3 is routed within the housing 11 so that the orientation thereof in the front-rear direction is changed once. As a result, the optical fiber 3 within the housing 11 has only one bent portion that is bent into a U shape, on the front upper side. That is to say, in this reference example, no bent portion is formed on the lower side of the parent substrate 20.

In this reference example, the direction of the optical fiber 3 in the optical coupling portion 43 (not shown in FIG. 26) is also slanted at an acute angle θ (45° in this example) with respect to the front-rear direction. Thus, in the reference example, it is also sufficient to bend only once the leading end portion 3I of the optical fiber 3, which is beyond the second front-side bent portion 3H. Therefore, it is possible to reduce the length of the leading end portion 3I in the front-rear direction, and it is possible to reduce the connector size.

Others

The above-described embodiment is merely for facilitating the understanding of the invention, but is not meant to be interpreted in a manner limiting the scope of the invention. The invention can of course be altered and improved as in the following description, for example, without departing from the gist thereof and includes functional equivalents.

Regarding Connector-Equipped Cable 1

The above-described connectored cable 1 was configured so as to comply with the Camera Link interface. However, the configuration of the above-described embodiment may also be employed for connectored cable for use in other applications.

Regarding Cable

Although the above-described composite cable 2 included the signal lines 5 and the power supply lines 6, the present invention is not limited to this. For example, a cable may be a connectored cable in which connectors are provided on respective end portions of an optical cable without the signal lines 5 and the power supply lines 6.

Moreover, although the above-described composite cable 2 included only one optical fiber, the present invention is not limited to this. For example, a composite cable may include a plurality of optical fibers.

LIST OF REFERENCE NUMERALS 1 connectored cable, 2 composite cable, 3 optical fiber, 3A base portion, 3B lower-side linear portion, 3C first front-side bent portion, 3D transition portion, 3E first upper-side linear portion, 3F rear-side bent portion, 3G second upper-side linear portion, 3H second front-side bent portion, 3I leading end portion, 3J end face 4 differential signal line, 5 signal line, 6 power supply line, 7 stripping portion, 8 caulking member, 10 camera-side connector, 11, 111 housing, 11A, 111A case, 11B, 111B cover, 12, 112 termination portion, 20, 120 parent substrate, 21 LVDS serializer, 22 camera-side MCU, 24, 124 recess, 25 connecting portion, 31, 131 rear-side through hole, 31A rear-side through hole row, 32, 132 front-side through hole, 32A front-side through hole row, 33 through hole for 2-pin header, 34 through hole for 10-pin header, 35 through hole for 4-pin header, 36 through hole for power supply line, 40, 140 child substrate, 41 light-emitting portion, 41A light-emitting face, 42 driving portion, 43, 143 optical coupling portion, 44, 144 recessed portion, 51, 151 protective cover, 52, 152 terminal portion, 61, 161 2-pin header, 62, 162 10-pin header, 63, 163 4-pin header, 110 grabber-side connector, 121 LVDS deserializer, 122 grabber-side MCU, 141 light-receiving portion, 142 current-to-voltage converting portion

The invention claimed is:

1. A connectored cable comprising:
a cable having an optical fiber for transmitting an optical signal; and
a connector
that accommodates a substrate on which a photoelectric conversion portion that is optically coupled to an end face of the optical fiber is installed, and
in which the optical fiber is wired
so that at least three bent portions are formed, the orientation of the optical fiber in a front-rear direction being changed, the optical fiber being bent into a U shape at each of the bent portions, and
so that one of two bent portions on a front side is located on a down side of the substrate and the other bent portion on the front side is located on an up side of the substrate,
the front-rear direction referring to a direction in which the cable extends from the connector,
a rear side referring to a side in which the cable extends as seen from the connector,
the front side referring to an opposite side of the side in which the cable extends,
the up side referring to a side of the photoelectric conversion portion as seen from the substrate,
the down side referring to an opposite side of the side of the photoelectric conversion portion.

2. A connectored cable according to claim 1, wherein
a recess is formed on an edge of the substrate, and
the optical fiber is wired between the down side and the up side of the substrate by passing through a space between an inner surface of the connector and the recess.

3. A connectored cable according to claim 1, wherein
the photoelectric conversion portion is mounted on a child substrate that is different from the substrate, and
the photoelectric conversion portion is installed on the substrate by electrically connecting the substrate and the child substrate.

4. A connectored cable according to claim 3, wherein
the optical fiber is wired with a portion of the optical fiber being sandwiched between the substrate and the child substrate.

5. A connectored cable according to claim 4, wherein
the bent portion that is formed on the rear side with respect to the two bent portions on the front side is located on the up side of the substrate, and
a portion between the two bent portions that are located on the up side of the substrate is sandwiched between the substrate and the child substrate.

6. A connectored cable according to claim 1, wherein
the optical fiber is bent between the bent portion that is located on the up side of the substrate and the end face of the optical fiber, and
the end face of the optical fiber and the photoelectric conversion portion are coupled to each other in such a manner that the optical fiber is slanted at an acute angle with respect to the front-rear direction.

7. A connectored cable according to claim 6, wherein
the substrate has a recessed portion that is obliquely formed with respect to the front-rear direction,
the optical fiber is arranged along the recessed portion, and
the end face of the optical fiber and the photoelectric conversion portion are coupled in such a manner that the optical fiber is slanted at the acute angle with respect to the front-rear direction.

8. A connectored cable according to claim 7, wherein
a portion of a coating of the optical fiber is located in the recessed portion, and
the coating of the optical fiber and the substrate are bonded in the recessed portion.

9. A connectored cable according to claim 6, wherein
the photoelectric conversion portion is mounted on a child substrate that is different from the substrate,
the photoelectric conversion portion is installed on the substrate by electrically connecting the substrate and the child substrate,
the optical fiber is wired with a portion of the optical fiber being sandwiched between the substrate and the child substrate, and
a bending direction of the optical fiber in the bent portion that is located closer to the end face of the optical fiber than the sandwiched portion is the same as a bending direction of the optical fiber between that bent portion and the end face of the optical fiber.

10. A connectored cable according to claim 1, wherein the cable further includes a signal line,
the substrate includes a through hole for connecting an end portion of the signal line by through-hole connection, and
inside the connector, any of the bent portions is located above a coating of the signal line that is connected to the substrate by through-hole connection.

11. A connectored cable according to claim 10, wherein the substrate includes
a rear-side through hole that is located on the side in which the cable extends and
a front-side through hole that is formed on the front side with respect to the rear-side through hole, and
a direction in which the end portion of the signal line is inserted into the rear-side through hole is opposite to a direction in which the end portion of the signal line is inserted into the front-side through hole.

12. A connectored cable according to claim 11, wherein any of the bent portions is located above the coating of the signal line that is connected to the rear-side through hole by through-hole connection.

13. A connectored cable according to claim 10, wherein the photoelectric conversion portion is mounted on a child substrate that is different from the substrate,
the photoelectric conversion portion is installed on the substrate by electrically connecting the substrate and the child substrate to each other, and
on both sides of the bent portion that is located above the coating of the signal line, the optical fiber is wired with a portion of the optical fiber being sandwiched between the substrate and the child substrate.

14. A method for manufacturing a connectored cable including
a cable having an optical fiber for transmitting an optical signal, and
a connector that accommodates a substrate on which a photoelectric conversion portion that is optically coupled to an end face of the optical fiber is installed,
the method comprising:
preparing the cable;
optically coupling the end face of the optical fiber and the photoelectric conversion portion to each other; and
wiring the optical fiber
so that at least three bent portions are formed, the orientation of the optical fiber in a front-rear direction being changed, the optical fiber being bent into a U shape at each of the bent portions,
so that one of two bent portions on a front side is located on a down side of the substrate and the other bent portion on the front side is located on a up side of the substrate,
the front-rear direction referring to a direction in which the cable extends from the connector,
a rear side referring to a side in which the cable extends as seen from the connector,
the front side referring to an opposite side of the side in which the cable extends,
the up side referring to a side of the photoelectric conversion portion as seen from the substrate,
the down side referring to an opposite side of the side of the photoelectric conversion portion.

* * * * *